(12) United States Patent
Madson

(10) Patent No.: US 9,815,220 B2
(45) Date of Patent: Nov. 14, 2017

(54) MULTI-FUNCTION ADJUSTABLE CHAINSAW

(71) Applicant: Dane Curtis Madson, Longview, TX (US)

(72) Inventor: Dane Curtis Madson, Longview, TX (US)

( * ) Notice: Subject to any disclaimer, the term of this patent is extended or adjusted under 35 U.S.C. 154(b) by 257 days.

(21) Appl. No.: 14/722,619

(22) Filed: May 27, 2015

(65) Prior Publication Data

US 2015/0273722 A1 Oct. 1, 2015

(51) Int. Cl.
B27B 17/08 (2006.01)
B27B 17/02 (2006.01)
B23D 57/02 (2006.01)

(52) U.S. Cl.
CPC ........... *B27B 17/08* (2013.01); *B23D 57/023* (2013.01); *B27B 17/02* (2013.01)

(58) Field of Classification Search
CPC ....... B27B 17/02; B27B 17/08; B27B 17/086; B23D 57/02; B23D 57/023; Y10T 83/909
USPC .................................................. 30/381–387
See application file for complete search history.

(56) References Cited

U.S. PATENT DOCUMENTS

| | | | |
|---|---|---|---|
| 2,618,350 A | 11/1952 | Von Ruden | |
| 2,703,928 A * | 3/1955 | Southwick | A01G 3/08 29/463 |
| 2,815,048 A * | 12/1957 | Davis | A01D 34/86 299/75 |
| 3,039,502 A * | 6/1962 | Spivey | B23D 57/0076 144/35.1 |
| 3,260,287 A * | 7/1966 | Oehrli | B23D 63/168 30/123.4 |
| 3,343,613 A * | 9/1967 | Carnesecca, Jr. | A01G 3/033 173/169 |
| 4,134,203 A | 1/1979 | Grube | |
| 4,233,739 A | 11/1980 | Hinrichs | |
| 4,680,862 A | 7/1987 | Wieland et al. | |
| 4,850,109 A | 7/1989 | Kerwin | |
| 5,077,896 A | 1/1992 | Rivera | |
| 6,560,879 B2 | 5/2003 | Franke et al. | |
| 7,055,250 B2 * | 6/2006 | Allemann | B23D 57/023 30/374 |
| 7,237,585 B2 | 7/2007 | McKnight | |
| 7,946,040 B2 | 5/2011 | Sugishita | |
| 2012/0102766 A1 | 5/2012 | Anderson et al. | |
| 2012/0117809 A1 | 5/2012 | Martinsson | |

* cited by examiner

*Primary Examiner* — Phong Nguyen
(74) *Attorney, Agent, or Firm* — Egbert Law Offices, PLLC

(57) ABSTRACT

A chainsaw apparatus has a body having a handle formed thereon or attached thereto, a motor, a saw blade coupled to the body so as to be extendable in transverse relationship to the longitudinal axis of the body, and a chain movably positioned on the saw blade. The motor is drivingly connected to the chain so as to cause the chain to move around the saw blade. The saw blade is adjustably coupled to the body so as to be movable between the position transverse to the longitudinal axis of the body to a position aligned with the longitudinal axis of the body. An angle adjustment mechanism is connected to the saw blade into the body. The angle adjustment mechanism is adapted to fix an angular position of the saw blade relative to the body.

9 Claims, 23 Drawing Sheets

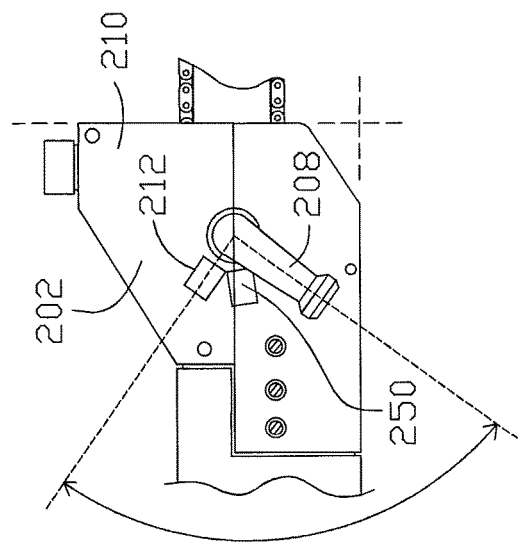
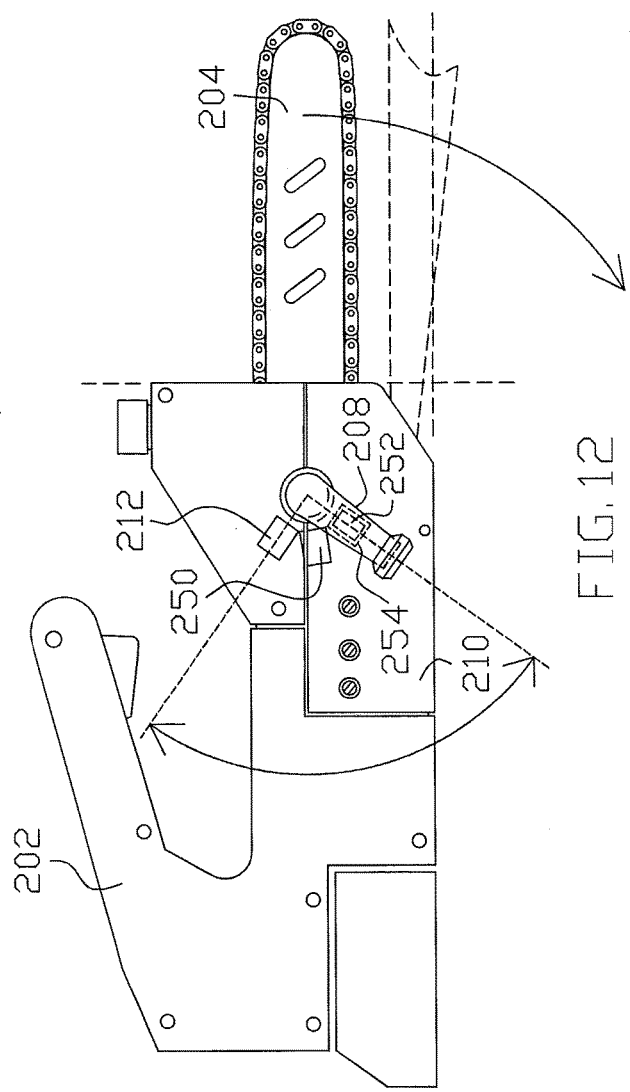

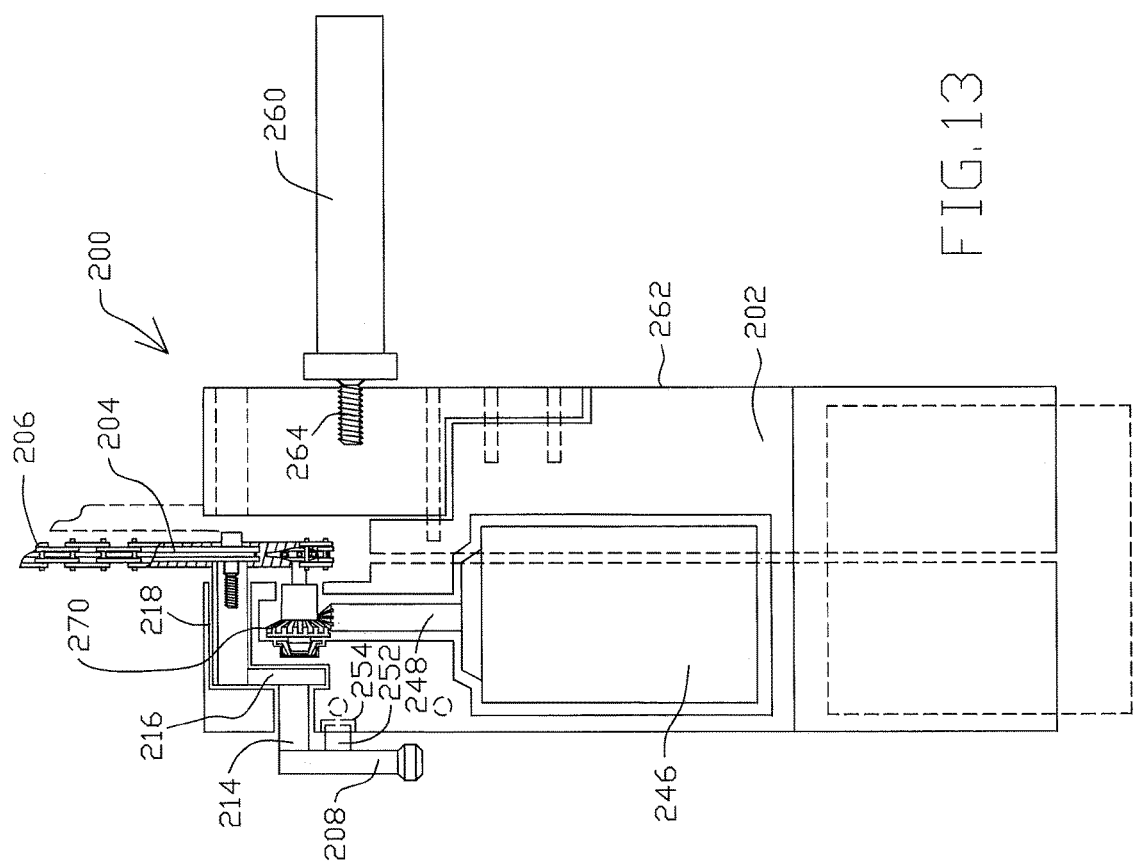

MULTI-FUNCTION ADJUSTABLE CHAINSAW

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to chainsaws. More particularly, the present invention relates to chainsaws in which the saw blade can be adjusted between various positions. Additionally, the present invention relates to chainsaws that have mechanisms for locking the saw blade in a desired orientation.

2. Description of Related Art Including Information Disclosed Under 37 CFR 1.97 and 37 CFR 1.98.

A chainsaw is a portable, mechanical saw which cuts with a set of teeth attached to a rotating chain that runs along a saw blade. Chainsaws are used in activities such as tree felling, limbing, bucking, pruning, to fell snags, to assist in cutting firebreaks in wildland fire suppression, and to harvest firewood. Chainsaws with specially designed blade and chain combinations have been developed as tools for use in chainsaw art and chainsaw mills. Specialized chainsaws are used for cutting concrete. Chainsaws are sometimes used for cutting ice, for example for ice sculpture.

A chainsaw will usually include several components. These components can include an engine, a drive mechanism, a saw blade and a cutting chain. Traditionally, the engine has been a two-stroke internal combustion engine or an electric motor. The drive mechanism is usually formed with a centrifugal clutch and a sprocket. The saw blade is an elongated bar with a round end of wear-resistant alloy steel typically between 16 and 36 inches in length. An edge slot guides the cutting chain. Specialized loop-style bars, called bow bars, were also used at one time for bucking logs and clearing brush. The cutting chain is usually formed of riveted metal sections in the form of a roller chain and features sharp cutting teeth. Each tooth takes the form of a fold so as to have chromium-plated steel with a sharp angular or curved corner and a pair of cutting edges, one on the top plate and one on the side plate. Left-handed and right-handed teeth are alternated on the chain. Chains come in varying pitch and gauge. The pitch of a chain is defined as half of the length spanned by any three consecutive rivets. The gauge is a thickness of the drive link where it fits into the saw blade. A tensioning mechanism is provided as a way to tension the cutting chain so that it neither binds nor comes loose from the guide bar. The underside of each link features a small metal finger called a "drive link" which helps locate the cutting chain on the saw blade and helps to carry lubricating oil around the blade. It is engaged with the drive sprocket of the engine within the body of the saw. The engine drives the cutting chain around the track by a centrifugal clutch so as to engage the chain as engine speed increases under power, but allows it to stop as the engine speed slows to an idle speed.

In the past, such chainsaws have the saw blade extending in longitudinal alignment with the body. As such, it creates a generally linear orientation. This configuration has been used successfully for many years in various sawing applications. Unfortunately, hereinbefore the saw blade has not been adjustable relative to the body of the chainsaw. As such, proper adaptations to carry out various and assorted functions have not been possible with the pre-existing chainsaw. Additionally, these pre-existing chainsaws have various surfaces that make it difficult to precisely align the chainsaw with the surface to be sawed. As such, a need has developed so as to be able to adjust the orientation of the saw blade relative to the body of the chainsaw so as to allow the chainsaw to carry out various functions such as pole saws, reciprocating saws, jigsaws, chainsaws, band saws, hack saws, circular saws, radial saws and chop saws.

In the past, various patents have issued relating to chainsaws. For example, U.S. Pat. No. 2,618,350, issued on Nov. 18, 1952 to R. E. Von Ruden, shows a mounting system for chainsaws. A flexible chain is mounted for use off of a motorized tractor or basic piece of farm or industrial equipment to cut by means of a hydraulic actuation.

U.S. Pat. No. 4,134,203, issued on Jan. 16, 1979 to G. Grube, discloses a multiple use chain saw mill. This is a mill for guiding the cutting of a chainsaw and includes a mill frame having a pair of longitudinally-spaced, parallel members joined by a plurality of rod-like runners extending orthogonally therebetween and joined to the lower surfaces thereof. A chainsaw bar is secured subsequent to the mill frame. It is selectively spaced therefrom by a pair of bolts extending through the chainsaw bar to the mill frame. A plurality of tubular spacer members are secured on each bolt between the bar and the mill frame.

U.S. Pat. No. 4,233,739, issued on Nov. 18, 1980 to L. W. Hinrichs, discloses a chainsaw accessory. This accessory device is provided for securement to a chainsaw so as to define a fixed predetermined distance of the cutting plane of the saw from an end of the work to be cut. This accessory device allows successive cuts of identical length to be rapidly formed. The accessory includes a plurality of straight cylindrical tubes nested in telescoping relationship in frictional engagement with each other. The desired length can be defined by the extent of telescoping of the tubes.

U.S. Pat. No. 4,680,862, issued on Jul. 21, 1987 to Wieland et al., teaches a motor-driven chainsaw that is electrically operated by means of a universal motor and has two break systems operating independently of one another. The electrical braking is effected by reversing the polarity of one pole of the coil of the field winding and short circuiting it with the rotor windings.

U.S. Pat. No. 4,850,109, issued on Jul. 25, 1989 to M. A. Kerwin, shows an adapter to convert a chainsaw to a circular saw. This adapter includes a collar secured to both the clutch housing and the hub of the existing chainsaw. The collar is held by a washer and a nut on the chainsaw. The collar is cylindrical and has a concentric opening. The adapter further includes a shaft extension plug threaded into the threaded opening of the collar. The shaft extension plug is for mounting a circular saw blade with a nut on the concentric shaft so as to hold the circular saw blade.

U.S. Pat. No. 5,077,896, issued on Jan. 7, 1992 to J. R. Rivera, teaches an adapter for converting a circular saw to a beam cutting chainsaw. The adapter carries a standard cutting chain and includes an attached assembly that is removably connected to the existing slide bars of the saw. The attachment assembly comprises a pivotal hinge and a hinge attachment plate. The hinge and the adjustment plates may be pivoted relative to one another to vary the effective length of the hinge attachment assembly so as to facilitate the connection of the adapter to the sidebars of the saw.

U.S. Pat. No. 6,560,879, issued on May 13, 2003 to Franke et al., provides a chainsaw adjuster that provides a semi-automatic tension adjustment of a cutting chain of a chainsaw as the links wear with use. A cam biases a tensioner pin to continuously force the guide bar away from the drive sprocket on the engine chassis to tension the chain.

U.S. Pat. No. 7,237,585, issued on Jul. 3, 2007 to L. T. McKnight, shows a flip-down chainsaw cutter. A metal frame has at least one wheel attached in a way that permits the frame to be moved from one location to another. A chainsaw is attached to the frame that can be used in more than one cutting position using remote controls attached to the metal frame and controlled by the operator. The operator controls the saw's cutting position either vertically or horizontally with a tension rope that moves the saw to the desired cutting position.

U.S. Pat. No. 7,946,040, issued on May 24, 2011 to Y. Sugishita, provides a chainsaw having a body case in which an engine for driving the chainsaw is accommodated. A top handle is provided on the upper side of the body case. The saw blade extends outwardly of the body case in a fixed position.

U.S. Patent Publication No. 2012/0102766, published on May 3, 2012 to Anderson et al., discloses a chainsaw arrangement that includes a saw blade, a cutting chain and a driving unit arranged to drive the cutting chain around the saw blade. The saw blade defines a first longitudinal axis along the center of the saw blade. The chainsaw further includes a handle section for carrying and operating the chainsaw. The handle section includes a control portion disposed on the upper side of the chainsaw.

U.S. Patent Publication No. 2012/0117809, published a May 17, 2012 to P. Martinsson, also teaches a chainsaw arrangement in which the chainsaw has an internal combustion engine connected to a crankshaft. The chainsaw is provided with a front handle having a central axis disposed at a distance from the central axis of the crankshaft.

It is an object of the present invention to provide a chainsaw apparatus that has multiple configurations.

It is another object of the present invention to provide a chainsaw apparatus that cuts various materials.

It is another object of the present invention to provide a chainsaw apparatus that allows the saw blade to be movable between a linear orientation with respect to the body and to a right angle with respect to the body.

It is another object of the present invention to provide a chainsaw apparatus that is incrementally adjustable.

It is still another object to provide a chainsaw apparatus that cuts custom curvatures and sawing cutline arcs.

It is another object of the present invention to provide a chainsaw apparatus that eliminates the need for expensive quick release and attachment accessories, along with external modifications.

It is still another object of the present invention to provide a chainsaw apparatus that allows for quick adjustment of the orientation of the saw blade with respect to the body.

It is another object of the present invention to provide a chainsaw apparatus that eliminates negative reversing effects and dulling effects.

It is another object of the present invention to provide a chainsaw apparatus with improved speed and power.

It is another object of the present invention to provide a chainsaw apparatus which, when operated in a position transverse to the longitudinal axis of the body, allows for deeper depth cut lengths and material penetration than conventional jigsaws and circular saws.

It is another object of the present invention to provide a chainsaw apparatus that is able to be grasped in a safe and effective manner.

It is another object of the present invention to provide a chainsaw apparatus that avoids awkward cutting angles.

It is another object of the present invention to provide a chainsaw apparatus that avoids a blocking of the view by the handle.

It is another object of the present invention to provide a chainsaw apparatus that minimizes potential injuries.

It is another object of the present invention to provide a chainsaw apparatus which prevents the saw blade from being disengaged from the lock-in-place position.

It is another object of the present invention to provide a chainsaw apparatus with no removable or interchangeable components or secondary attachment parts.

It is a further object of the present invention to provide a chainsaw apparatus that allows for cutting and sawing up to a right angle corner joint.

It is another object of the present invention to provide a chainsaw apparatus that eliminates the need for bulky storage cases.

It is another object of the present invention to provide a chainsaw apparatus that is able to reach hard-to-access locations.

It is still a further object of the present invention to provide a chainsaw apparatus that allows for cutting and sawing in elevated locations.

These and other objects and advantages of the present invention will become apparent from a reading of the attached specification and appended claims.

BRIEF SUMMARY OF THE INVENTION

The present invention is a chainsaw apparatus that comprises a body having a handle formed thereon or attached thereto, a motor, a saw blade coupled to the body and extendable in transverse relationship to the longitudinal axis of the body, and a chain movably positioned on the saw blade. The motor is drivingly connected to the chainsaw as to cause the chain to move around the saw blade.

The saw blade is adjustably coupled to the body so as to be movable between the position transverse to the longitudinal axis of the body to a position aligned with the longitudinal axis of the body. An angle adjustment mechanism is connected to the saw blade and the body. The angle adjustment mechanism is adapted to fix an angular position of the saw blade relative to the body. In one embodiment, the angle adjustment mechanism includes a plate that is pivotally received by the body. The plate is affixed to an end of the saw blade. The saw blade and the chain extend outwardly of the plate. The plate has a plurality of slots formed in spaced relation to each other on a periphery of the plate. A spring lock is connected to the body and has a surface receivable in at least one of the plurality of slots so as to fix an angular orientation of the saw blade relative to the body.

In another embodiment of the angle adjustment mechanism associated with the chainsaw apparatus of the present invention, the angle adjustment mechanism includes an arm connected to the saw blade and extending outwardly therefrom. The arm is rotatable relative to the body. The arm is rotatable so as to change an angular orientation of the saw blade relative to the body. The body has a cavity formed therein adjacent to a forward surface of the body. A shift member is affixed to the saw blade and positioned in the cavity of the body. The arm is connected to the shift member and extends outwardly of the body. The body has a plurality of grooves formed on a surface thereof. The plurality of grooves are in spaced relationship to each other. The arm has a lock element thereon. The lock element extends toward one of the plurality of grooves. The lock element is engageable with one of the plurality of grooves so as to fix the angular orientation of the saw blade with respect to the body.

In another embodiment of the angle adjustment mechanism of the chainsaw apparatus of the present invention, a toothed member is affixed at a pivot axis between the body and the saw blade. The toothed member defines a plurality of slots between adjacent teeth of the toothed member. A lock is selectively engageable with at least one of the plurality of slots of the tooth member so as to fix an angular orientation of the saw blade with respect to the body. The lock includes a pin that is slidably positioned in the body. The pin has an end engageable with the slot of the toothed member. A spring is cooperative at the pin so as to urge the pin in a direction toward the toothed member. A release member is affixed to the pin and positioned on an exterior of the body. The release member is movable so as to separate the end of the pin from the slot.

In still another embodiment of the angle adjustment mechanism of the chainsaw apparatus of the present invention, a shift handle extends outwardly of one side of the body in transverse relationship to the longitudinal axis of the body. The shift handle has an end affixed to the saw blade such that a rotation of the shift handle causes a corresponding movement of the saw blade.

The body has a surface thereon that extends in spaced parallel relation to the saw blade. The body also has a surface thereon that is in parallel relationship to a longitudinal axis of the saw blade when the saw blade is in the position aligned with the longitudinal axis of the body. The chain has an outermost surface aligned and in coplanar relationship with the forward surface of the body. The body can also have a guide plate adjustably positioned thereon or therein. The guide plate has a planar surface at an end thereof. The planar surface defines a guide plane forward of the forward surface of the body. The planar surface is in parallel planar relationship to the surface of the chain. A laser pointer can be mounted in the body. The laser pointer is adapted to direct a laser beam in a direction corresponding to an orientation of the saw blade.

In the preferred embodiment of the present invention, the motor is an electric motor. A battery pack is electrically connected to the electric motor. The motor has a shaft extending outwardly therefrom. The chain has a sprocket rotatably mounted to the chainsaw blade and engaged with the chain. The shaft has a spline gear at an end thereof. The spline gear is engaged with a gear connected to the sprocket such that a rotation of the shaft causes a rotation of the sprocket and the movement of the chain. The handle of the body extends upwardly at an acute angle with respect to an upper surface of the body. The handle has a power switch mounted thereto. The power switch is electrically connected to the motor. Alternatively, the engine can be a combustible fuel operated engine or electrically-connectable power cord equipped electric motor.

The foregoing Summary of the Invention section is intended to describe, with particularity, the preferred embodiments of the present invention. It is understood that variations to these preferred embodiments can be made within the scope of the present claims. As such, this Section should not construed, in any way, as limiting of the broad scope of the present invention. The present invention should only be limited by the following claims and their legal equivalents.

BRIEF DESCRIPTION OF THE SEVERAL VIEWS OF THE DRAWINGS

FIG. 11 is a detailed view showing the arm as used for saw blade adjustment in the third embodiment of the present invention.

FIG. 12 is a side elevational view showing the locking mechanism as used with the chainsaw apparatus of the third embodiment of the present invention.

FIG. 13 is a cross-sectional top view of the third embodiment of the chainsaw apparatus of the present invention.

DETAILED DESCRIPTION OF THE INVENTION

Figure 1:
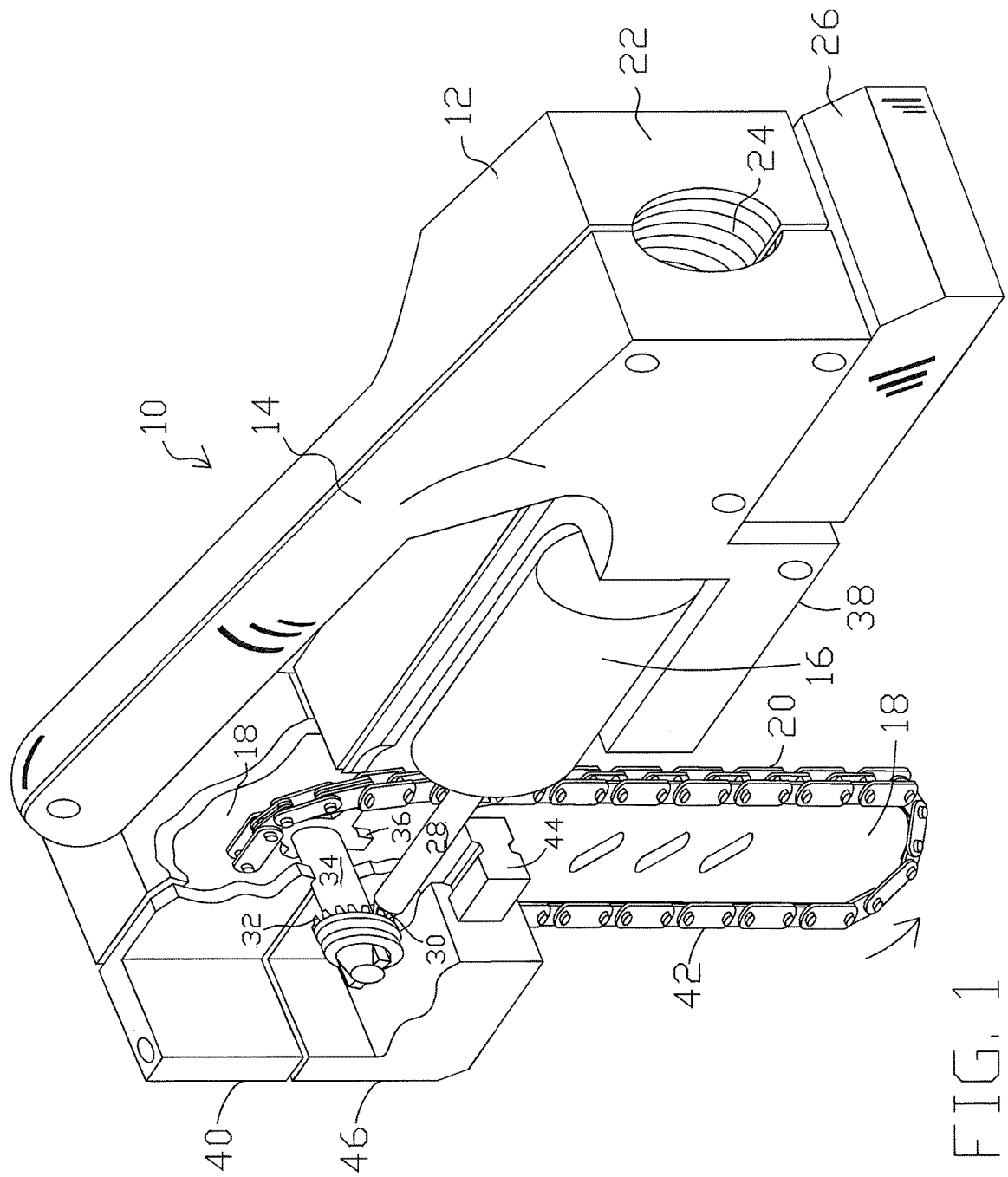
FIG. 1 is a perspective and partially cutaway view of the chainsaw apparatus of a first simple embodiment of the present invention.

Referring to FIG. 1, there is shown the first simplest embodiment of the chainsaw apparatus 10 of the present invention. The chainsaw apparatus 10 includes a body 12 having a handle 14 formed thereon or attached thereto. The body 12 has a longitudinal axis. A motor 16 is positioned within the body 12. A saw blade 18 is coupled to the body 12. The saw blade 18 extends in transverse relationship to the longitudinal axis of the body 12. A chain 20 is movably positioned on the saw blade 18. The motor 16 is drivingly connected to the chain 20 so as to cause the chain 20 to move around the saw blade 18.

In FIG. 1, it can be seen that the handle 14 of the body 12 extends at a generally acute angle with respect to the remainder of the body 12. As will be described hereinafter, a power switch will be located at an upper end of the handle 14. The back end 22 of the body 12 includes a threaded receptacle 24. The threaded receptacle 24 is suitable for attachment to a pole when the chainsaw apparatus 10 is intended to be used in an extended or overhead orientation, such as for the cutting of elevated limbs. A battery pack 26 is affixed to the exterior of the body 12 (or can be incorporated therein). Battery pack 26 is intended to supply electrical energy to the motor 16.

The motor 16 is, in the preferred embodiment of the present invention, an electric motor. As such, the battery pack 26 will supply electrical energy to the motor 16. The motor 16 includes a shaft 28 extending outwardly therefrom. Shaft 28 has a spline gear 30 at an end thereof opposite the motor 16. Spline gear 30 engages with the teeth of a gear 32. Gear 32 is affixed to an end of another shaft 34. Shaft 34 is affixed to a sprocket 36 that is rotatably mounted to the saw blade 18. The sprocket 36 has teeth that engage with the chain 20. As such, when the power switch on the handle 14 is pressed on, this will cause the motor 16 to rotate the shaft 28. This, in turn, causes the spline gear 30 at the end of the shaft 28 to engage with the teeth of the gear 32 so as to rotate the shaft 34 and the sprocket 36. As such, the motor 16 is able to instill movement of the chain 20 around the blade 18.

The blade 18 is illustrated, in the simple embodiment of the chainsaw apparatus 10, in a downwardly extending position generally transverse to the longitudinal axis of the body 12. As such, the chainsaw apparatus 10 is particularly configured so as to make cuts that are transverse to the body 12. So as to guide in the cutting, a flat base 38 is formed on the body 12. As such, this flat base 38 will assure that the chain 20 is extending in transverse relationship to the base 38.

The body 12 also includes a forward surface 40. Forward surface 40 extends in spaced parallel planar relationship to the outer surface 42 of the chain 20. As such, when the forward surface 40 is placed against another surface, it is further assured that the chain 20 will make straight cuts. Guide plate 44 allows for the forward planar surface 46 to be at a desired gap between the planar base 46 and the outer surface of the chain 42. As such, the present invention is particularly adapted so as to make very precise cuts in the orientation shown in FIG. 1.

Figure 2:
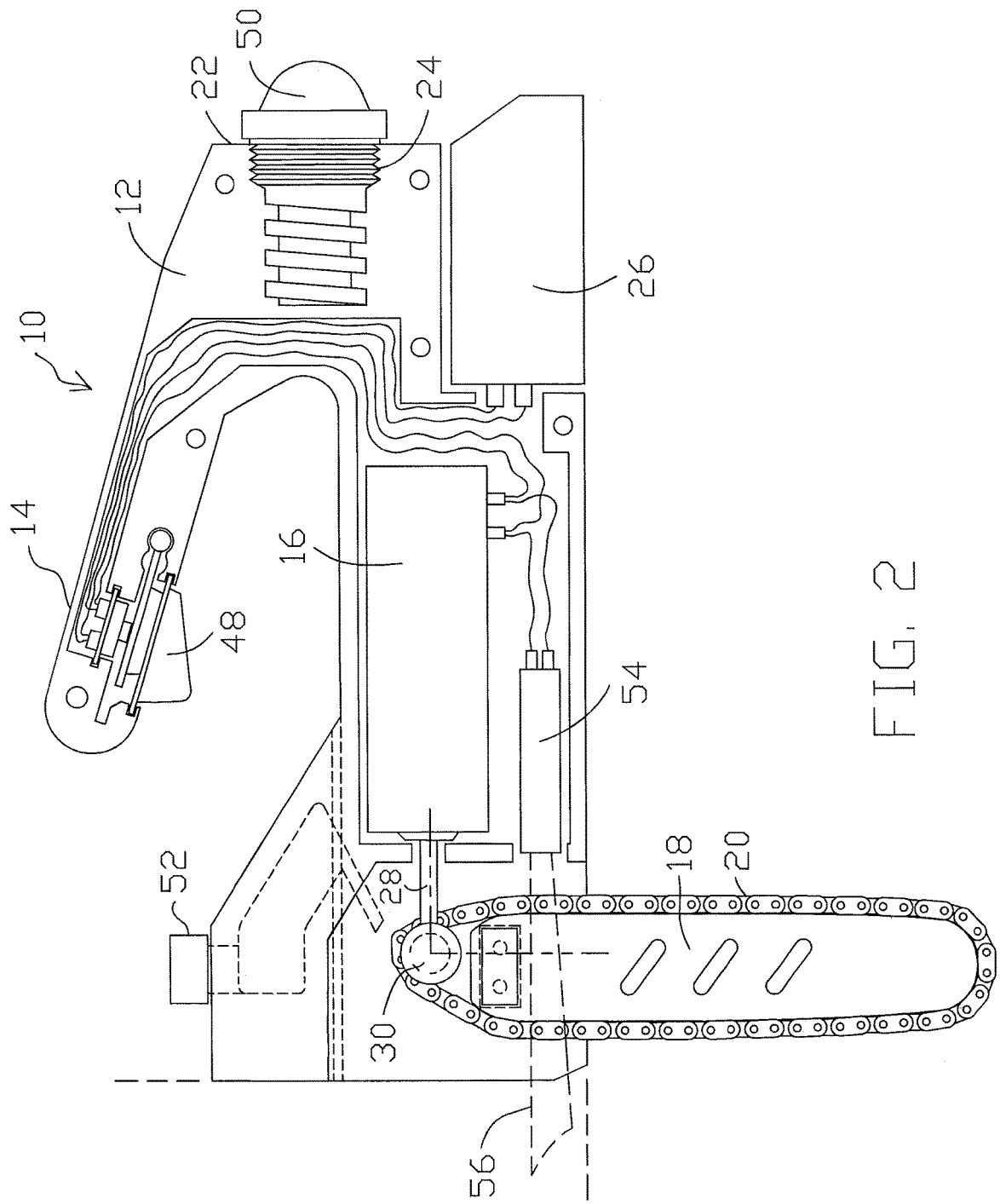
FIG. 2 is a cross-sectional view of the chainsaw apparatus of the first simplest embodiment of the present invention.

FIG. 2 is a cross-sectional view of the chainsaw apparatus 10. In FIG. 2, the body 12 is shown as having a power switch 48 positioned at the end of the handle 14. Power switch 48 is electrically connected by various lines to the motor 16 and to the battery pack 26. As such, the power switch 48 is cooperative with the motor 16 and the battery pack 26 so as to activate the motor 16 and to control the speed of the motor 16. The plug 50 is mounted into the threaded receptacle 24 at the back surface 22 of the body 12.

In FIG. 2, it can be seen that the motor 16 has the shaft 28 configured so as to rotate the gear 30 and to cause the movement of the chain 20 over the outer periphery of the saw blade 18. In order to assure lubrication of the chain 20, a lubricating port 52 is provided at the top of the body 12. The lubricating port 52 can include a suitable reservoir such that a lubricating fluid can be delivered to the outer periphery of the chain 20.

In FIG. 2, it can be seen that there is a laser pointer 54 positioned on the interior of the body 12. Laser pointer 54 is connected by lines to the motor 16 and to the battery 26. The laser pointer 54 is capable of generating a laser beam 56 so as to provide the user of the chainsaw apparatus 10 with proper visual guidance in order to make a straight cut.

Figure 3:
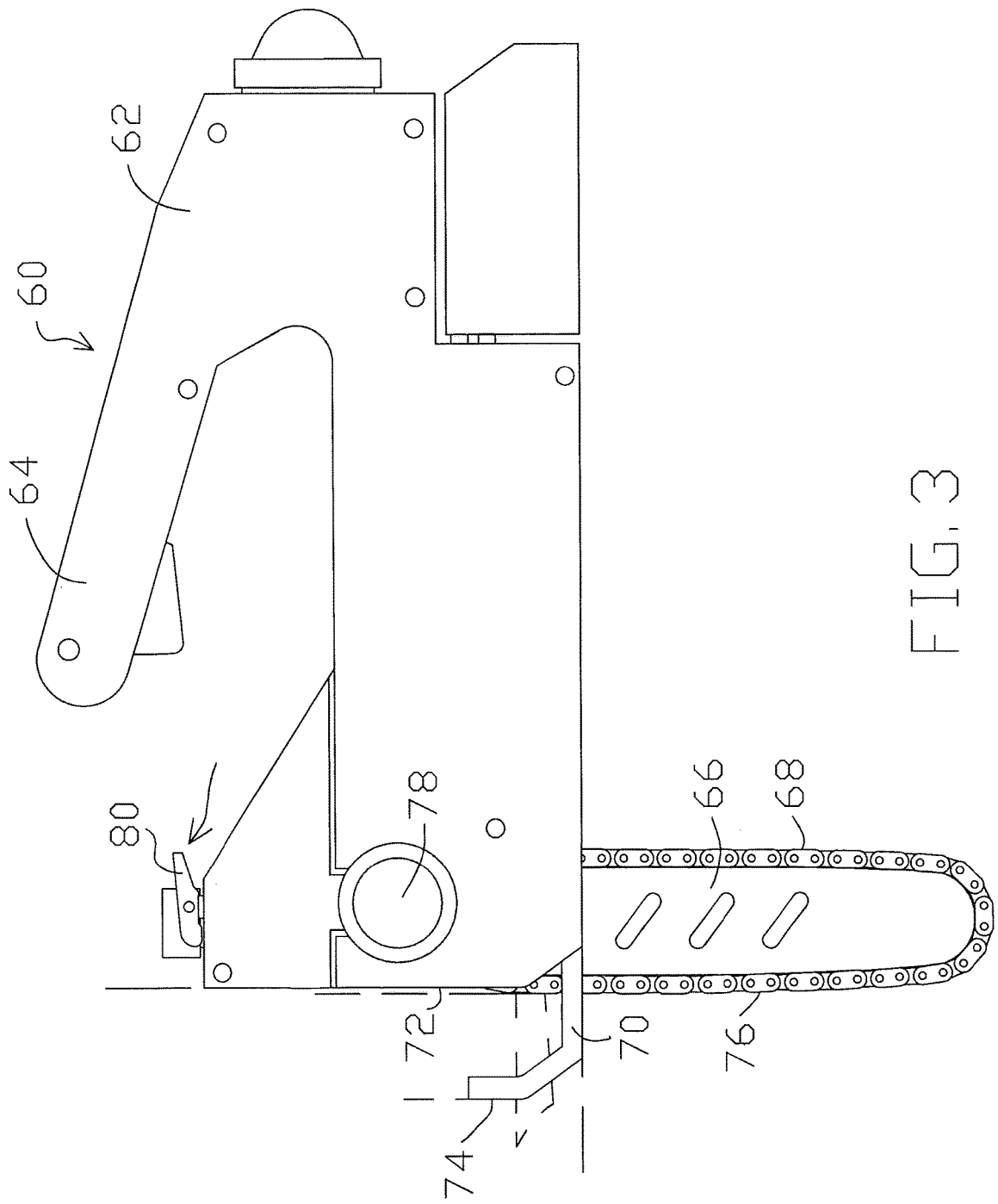
FIG. 3 is a side elevational view of the chainsaw apparatus of the present invention showing a guide plate extending from a forward end thereof.

FIG. 3 shows a second embodiment of the chainsaw apparatus 60 of the present invention. Chainsaw apparatus 60 includes a body 62 having a handle 64 extending outwardly therefrom. Body 62 is similar to the body shown in the simple embodiment of the present invention of FIGS. 1 and 2. The saw blade 66 is illustrated as extending in transverse relationship to the longitudinal axis of the body 62. Chain 68 extends over the periphery of the saw blade 66 so as to achieve a proper cut. Also, in FIG. 3, the guide plate 70 is illustrated as extending outwardly of the forward surface 72 of the body 62. The guide plate 70 includes a planar surface 74 that will extend in a generally parallel planar relationship to the forward surface 72. As such, the proper distance between the outer periphery 76 and the planar surface 74 can be achieved in order to create a proper and desired cut.

In FIG. 3, a shift member 78 is illustrated as extending outwardly of the body 62. Shift member 78, as will be described hereinafter, is intended to allow the user to properly shift the position of the saw blade 66 from the orientation transverse to the longitudinal axis of the body 62 to and orientation aligned with the longitudinal axis of the body 62. A lock mechanism 80 is provided on the exterior of the body 62 and is cooperative with the shift member 78 so as to fix the position of the saw blade 66 when it moves from one orientation to another orientation.

Figure 4:
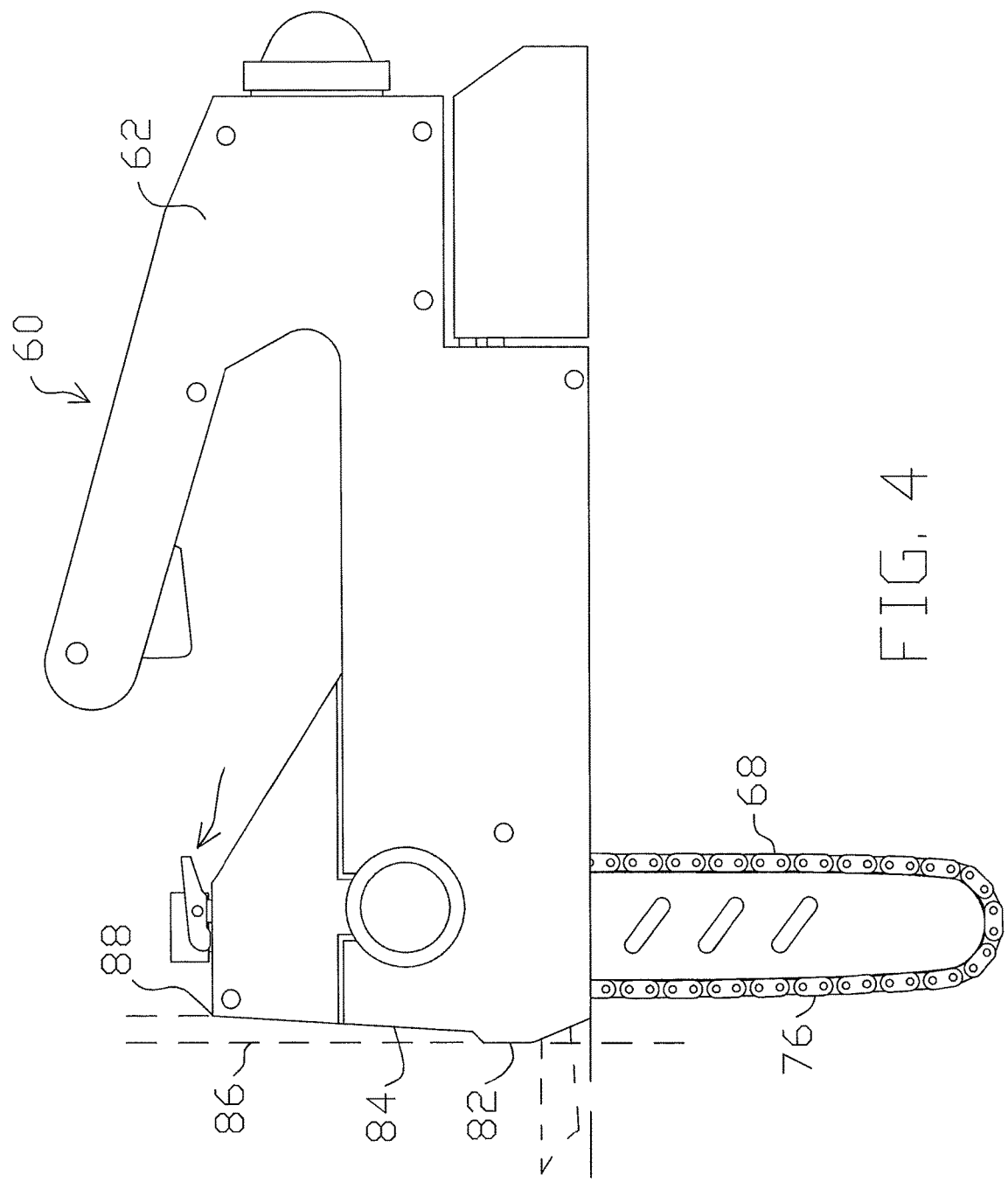
FIG. 4 is a side elevational view of a second embodiment of the chainsaw apparatus of the present invention.

FIG. 4 shows a variation of the second embodiment 60 of the present invention. In particular, in FIG. 4, it can be seen that there is a cleat 82 formed on the forward surface 84. Cleat 82 provides a surface suitable for contacting an exterior surface 86 so that the proper distance between the outer periphery 76 of the chain 68 and the surface 86 can be achieved. It can be seen that the outer periphery 76 is recessed inwardly of the forward surface 84. The forward surface 84 extends angularly inwardly from the cleat 82 in order to enhance visibility from the top side by the user. The uppermost end 88 of the forward surface 84 of the body 62 will generally correspond in location to the outer periphery 76 of the chain 68. Once again, this further facilitates proper cuts using the chainsaw apparatus 60 of the present invention.

Figure 5:
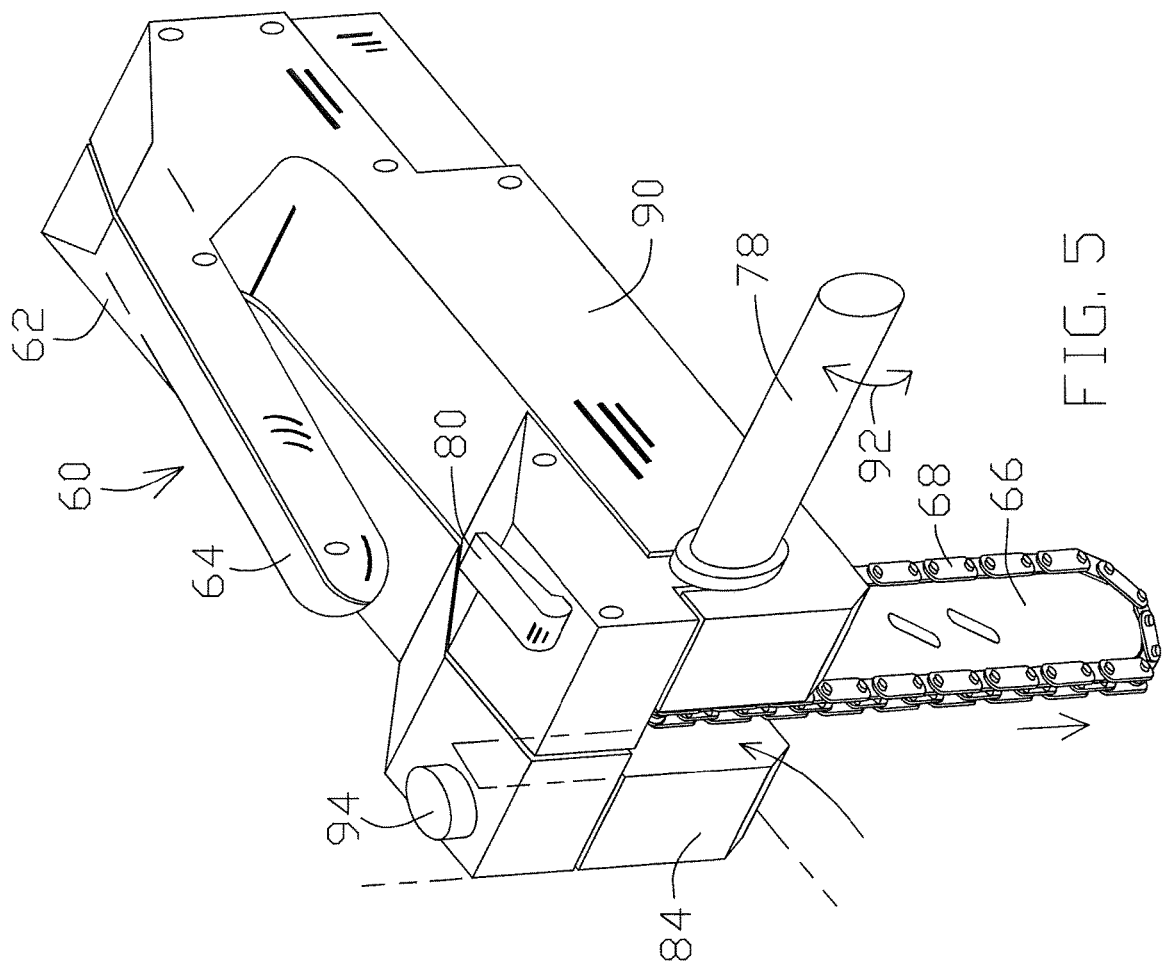
FIG. 5 is a perspective view of the second embodiment of the chainsaw apparatus of the present invention.

FIG. 5 is a perspective view showing the second embodiment of the chainsaw apparatus 60 of the present invention. Importantly, FIG. 5 shows the arrangement of the shift member 78. Shift member 78 is in the nature of a handle that extends outwardly of the side 90 of the body 60. As such, the shift member 78 provides additional stability to the user by the user gripping both the handle 64 and the shift member 78.

In FIG. 5, arrow 92 illustrates that the shift member 78 can be suitably rotated. As such, the shift member 78 can be rotated by the hand of the user so as to move the saw blade 66 and the chain 68 from the orientation extending transverse to the longitudinal axis of the body 62 to an orientation aligned with the longitudinal axis of the body 62. Chain 68 is illustrated as recessed inwardly of the forward surface 84 of the body 62. A lubrication port 94 is provided so as to allow a lubricating fluid to be introduced into the interior of the body 62 for the lubrication of the chain 68 during sawing activities. The lock mechanism 80 is located at the top surface of the body 62 and directly above the shift member 78.

Figure 6:
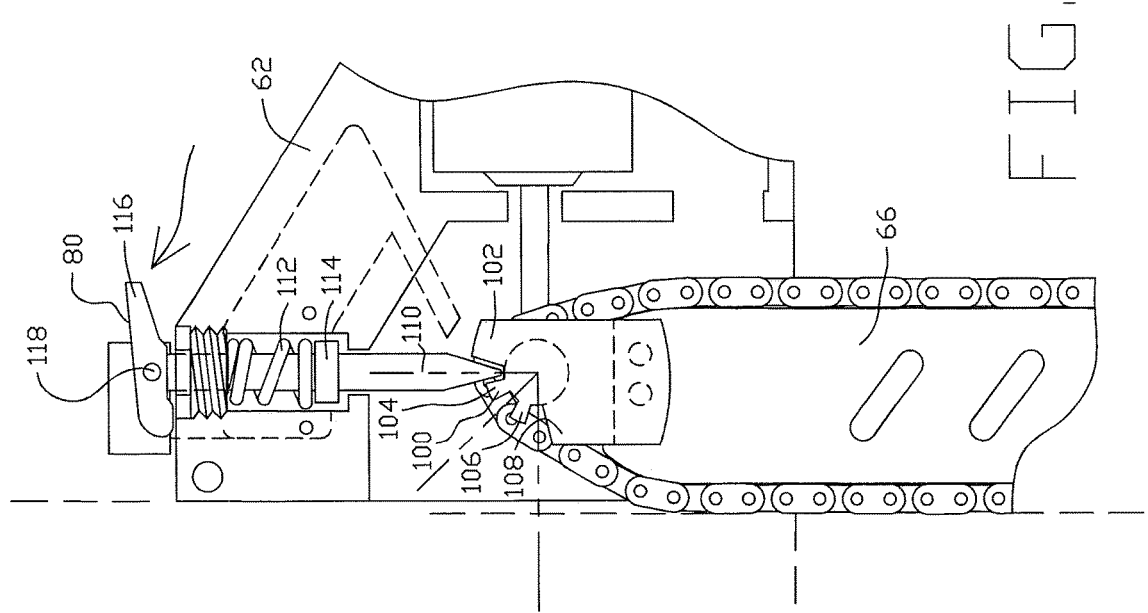
FIG. 6 is a detailed cross-sectional view showing the locking mechanism associated with the chainsaw apparatus of the second embodiment of the chainsaw apparatus of the present invention.

FIG. 6 illustrates the operation of the lock member 80. In particular, there is a toothed member 100 that is affixed to the saw blade 66. The toothed member 100 includes slots that are formed between adjacent teeth. In particular, the toothed member 100 includes a first tooth 102, a second tooth 104, a third tooth 106, and fourth tooth 108. It can be seen that the lock member 80 includes a pin 110 that had an end received between the first tooth 102 and the second tooth 104. As such, the saw blade 66 will be locked in its position extending transverse to the longitudinal axis of the body 62. A spring 112 is positioned over the pin 110 and is arranged against an abutment surface 114 so as to urge the pin 110 downwardly into the slot defined by the teeth 102 and 104. As such, this assures that the pin 110 will effectively continuously lock the position of the saw blade 66.

When it is desired to move the saw blade 66 from the downwardly extending position to another angular orientation, the release member 116 can be lifted upwardly so as to overcome the urging force of the spring 112. The pin 110 has an upper end that is pivotally attached at 118 to the release member 116. As such, the end of the pin 110 will be released from the slot between the teeth 102 and 104. As a result, the shift member 78 can be suitably rotated so as to move the saw blade 66 to another position.

Figure 7:
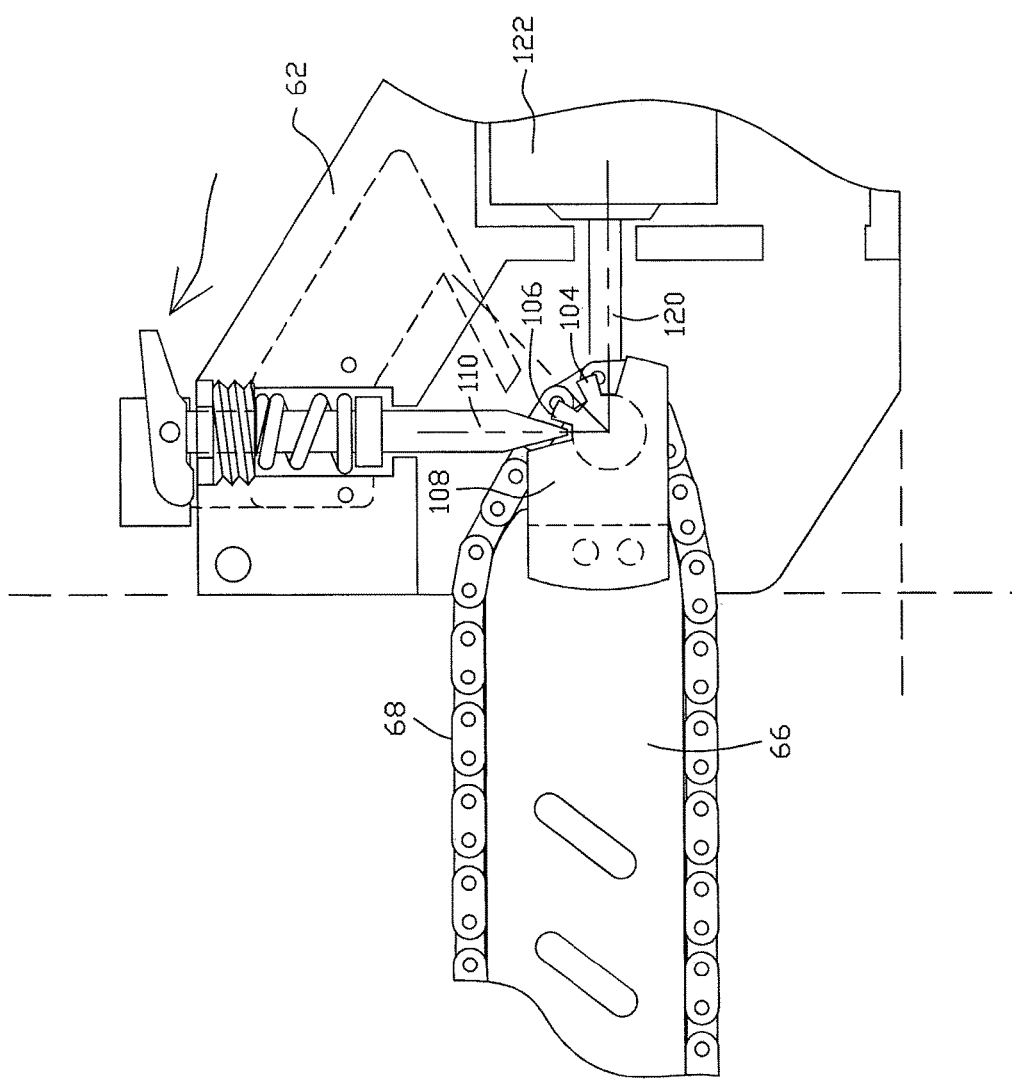
FIG. 7 is a cross-sectional view showing the operation of the locking mechanism of the chainsaw apparatus of the second embodiment of the present invention.

FIG. 7 illustrates the position of the saw blade 66 in its position aligned with the body 62. In this situation, the pin 110 has been placed between the teeth 108 and 106. This strong relationship between the end of the pin 110 and the slot defined between the teeth 106 and 108 will assure that the blade 66 is maintained continuously in its orientation aligned with the longitudinal axis of the body 62. The shaft 120 of the motor 122 can then deliver suitable power, in the manner described herein previously, so as to cause the movement of the chain 68 over the saw blade 66.

It should be noted from the illustration of FIG. 7 that there is a space between the tooth 106 and the tooth 104. When the pin 110 is moved to this the slot between the teeth 104 and 106, the saw blade 66 will assume an angle that is located generally inbetween the two positions illustrated in FIGS. 6 and 7. As such, a different angular orientation of the blade 66 can be properly achieved.

An important feature of all of the configurations of the present invention is that whenever the user decides to readjust or realign the saw blade 66 by means of rotating the necessary components to do so, the actual chain 68 will always remain at a near consistent degree of forceful tension so as to remain tight and taut against the sprocket and also properly secured to the saw blade 66. As such, the present invention is suitably adjustable such that the tension on the chain will remain constant regardless of the orientation of the saw blade 66.

The extended shift arm section, known as the shifting member, is generally of a near equal radial circular span equivalent such that when the rod is rotated by means of any of the handles or arms, the corresponding radial span rotation of the shifting member's farthest endpoint, bolted directly to the saw blade, will rotate smoothly to keep the chain 68 taut and tight. The chain always remains in possession in a safe manner. In order for this to actually work, the sprocket is allowed to slightly "free spin" during this process, both in the clockwise direction and the counter-clockwise direction. The motor will not seize or restrict the sprocket from allowing this necessary "free play" during the rotational action since brushless electric motors will allow a small amount of movement even when not in use. The user can easily turn the main rotor shaft of the motor by hand. As a result, this is effective in performing both rotational directions of adjustment by the saw blade 66 by any of the available adjustment mechanisms.

Figure 8:
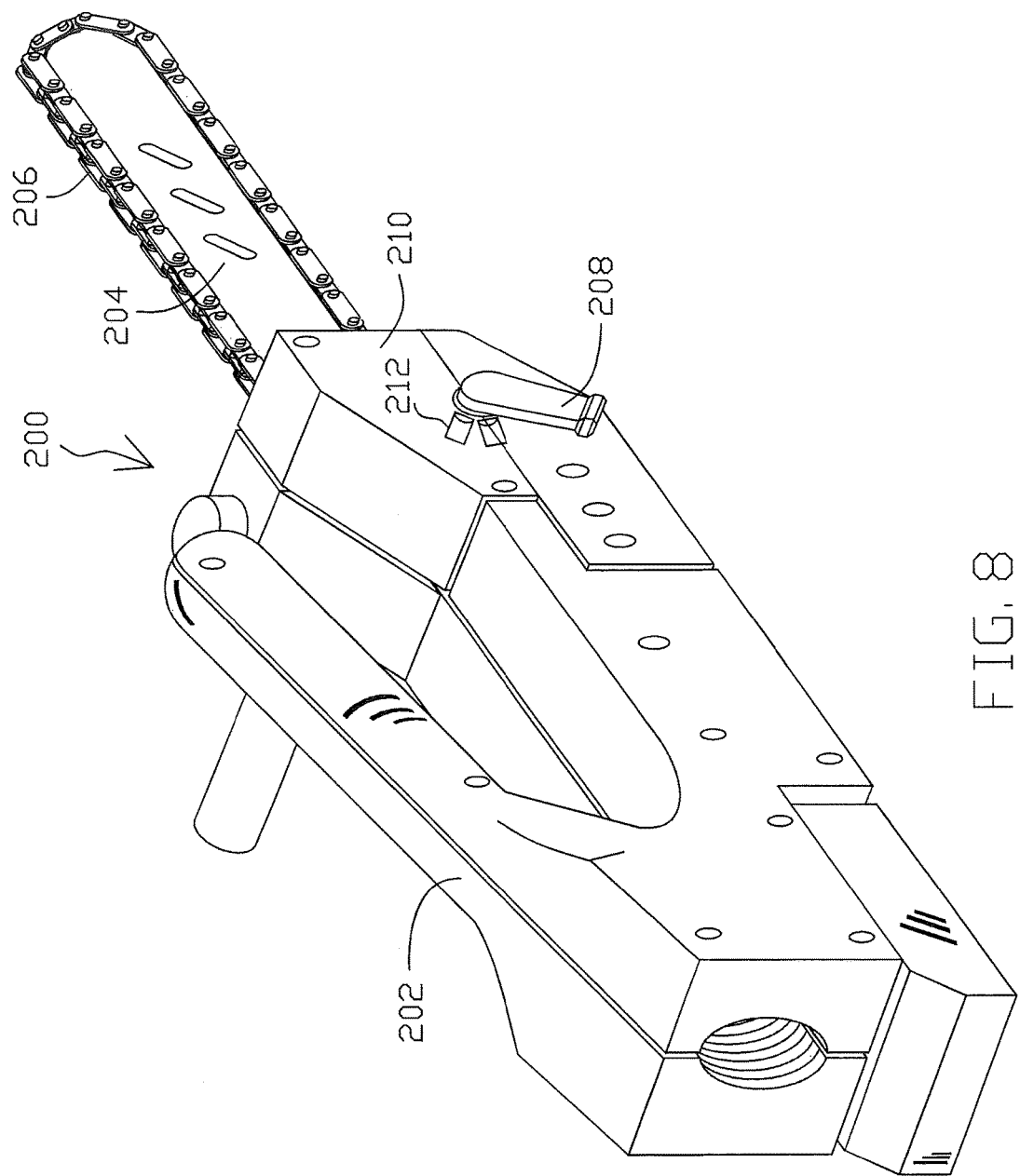
FIG. 8 is a perspective view of a third embodiment of the chainsaw apparatus of the present invention.

FIG. 8 illustrates a third alternative embodiment of the chainsaw apparatus 200 of the present invention. The chainsaw apparatus 200 includes a body 202, a saw blade 204 and a chain 206 extending around the saw blade 204 in the manner described herein previously. An arm 208 is illustrated as extending outwardly of the side 210 of the body 202. Arm 208 is utilized so as to change the angular orientation of the saw blade 204. The side 210 of the body 202 includes a plurality of grooves 212 formed therein. Grooves 212 will serve as the locking mechanism for the proper positioning of the saw blade 204. The arm 208 is rotatable relative to the body 202.

Figure 9:
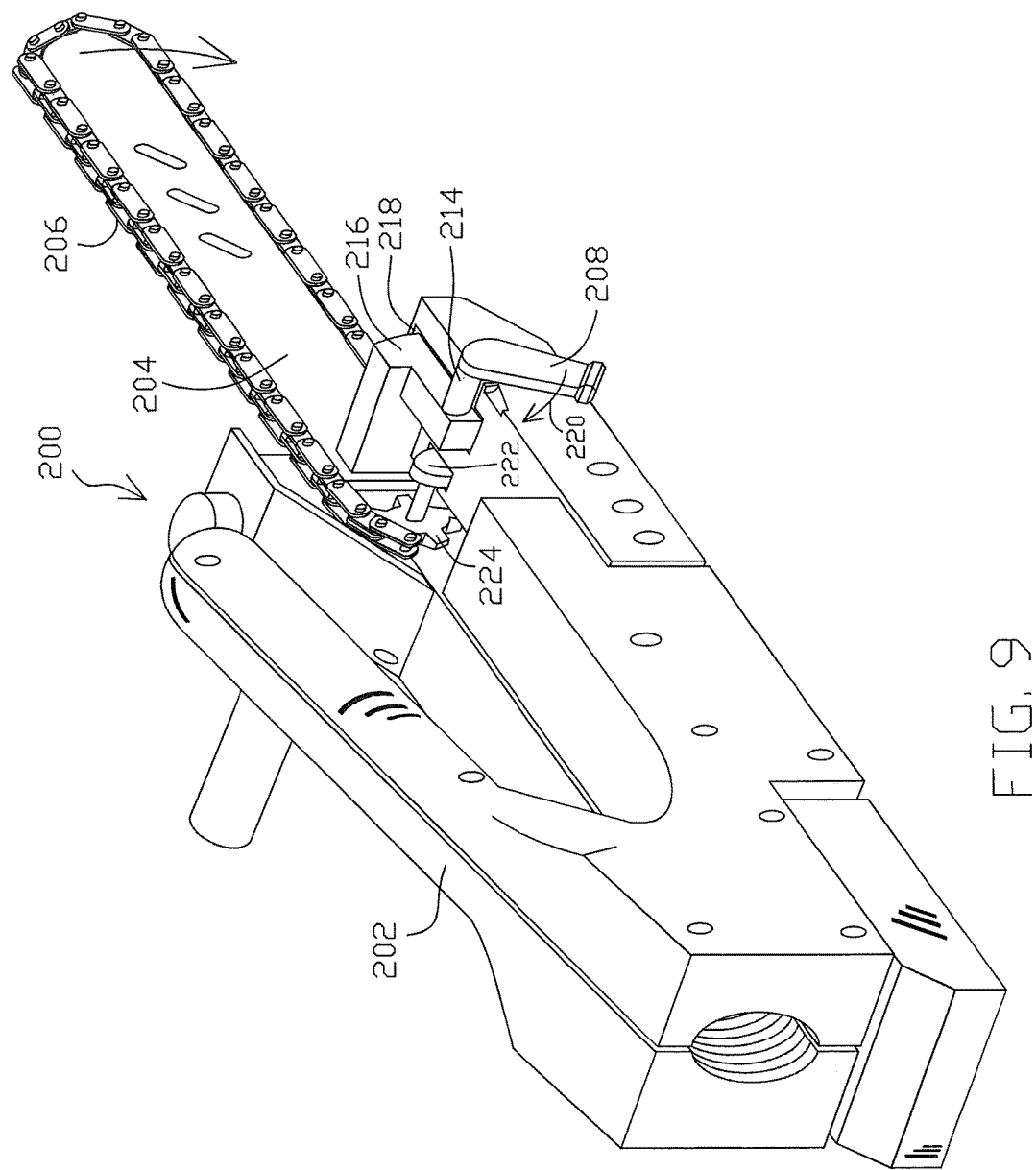
FIG. 9 is a perspective and partially cutaway view of the third embodiment of the chainsaw apparatus of the present invention.

FIG. 9 is a cutaway view showing the interior construction of the chainsaw apparatus 200 of the present invention. In FIG. 9, it can be seen that the arm 208 is connected by a rod 214 to a shifting member 216. Shifting member 216 is located within a cavity 218 of the body 202. The shifting member 216 is directly affixed to the saw blade 204. As such, when the arm 208 is moved upwardly in the direction of arrow 220, the saw blade 204 can move from its position aligned with the longitudinal axis of the body 202 toward a position that extends transverse to the longitudinal axis of the body 202. The chain 206 is driven in a manner described herein previously. In particular, the gears associated with the motor can engage with a hub 222 that causes the rotation of a sprocket 224. Sprocket 224 is engaged with the chain 206.

Figure 10:
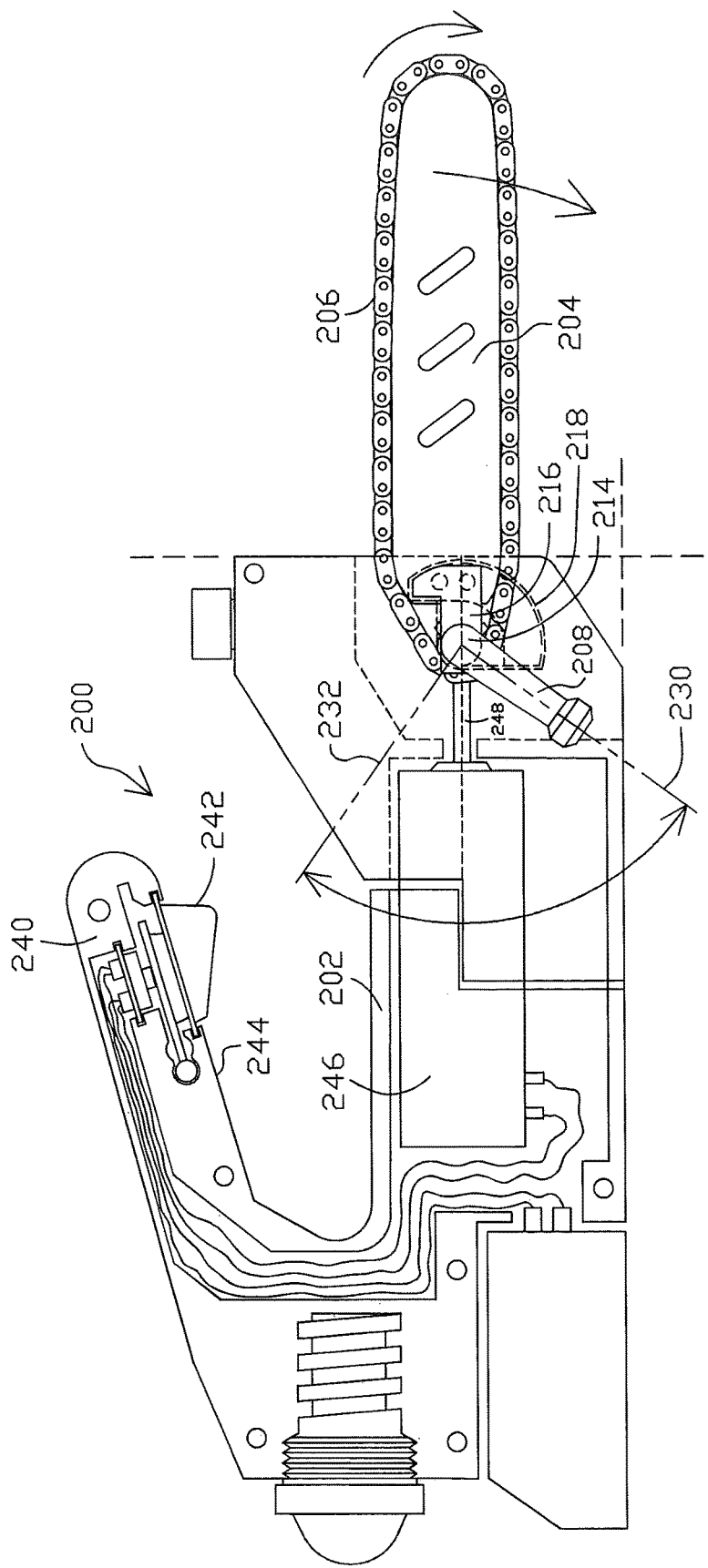
FIG. 10 is a cross-sectional side view of the third embodiment of the chainsaw apparatus of the present invention.

FIG. 10 shows the interior of the third embodiment 200 of the chainsaw apparatus of the present invention. In particular, FIG. 10 shows that the arm 208 can be movable from the first position (illustrated by line 230) to a second position (illustrated by line 232). The shifting member 216 resides within the cavity 218 of the body 202. As such, when the arm 208 moves from the position shown by line 230 to the position shown by line 232, the shifting member 216 will rotate within the cavity 218 so as to cause the saw blade 204 and the chain 206 to move downwardly.

FIG. 10 also shows that the body 202 has a configuration similar to the previous embodiments. In particular, a handle 240 extends angularly upwardly at an acute angle from the body 202. A power switch 242 is mounted on the underside 244 of the handle 240. The motor 246 is drivingly connected by a shaft 248 to the hub 222 and eventually to the sprocket 224 so as to drive the rotation of the chain 206.

FIGS. 11 and 12 particularly show the locking mechanism associated with the arm 208 of the third alternative embodiment of the chainsaw apparatus 200. In FIG. 11, there are grooves 212 and 250 that are formed on the side 210 of the body 202. The arm 208 will have an interior spring-loaded element that is engageable with one of the grooves 212 and 250. There is a groove directly associated with the position of the arm 208 in FIG. 11 that is obscured by the arm 208. FIG. 12 shows that the arm 208 has a key 252 positioned therein. Key 252 is engaged with the groove 254 on the side 210 of the body 202. As such, the saw blade 204 will be locked in a position aligned with the longitudinal axis of the body 202. The key 252 can be lifted from the groove 254 so as to engage either the groove 250 or the groove 212. When the key 252 engages with the groove 212, the saw blade 204 will be in its position extending transverse to the longitudinal axis of the body 202.

FIG. 13 is a further illustration of the operation of the third alternative embodiment of the chainsaw apparatus 200 of the present invention. In FIG. 13, can be seen that there is a handle 260 that is affixed to the side 262 of the body 202. The handle 260 is mounted by a threaded connection 264 to the body 202. The handle 260 is on the side of the body 202 opposite to the arm 208. The arm 208 is illustrated as having the key 252 engaged with the groove 254. The arm 208 is connected by the rod 214 to the shifting member 216 within the cavity 218 of the body 202. As such, the shifting member 216 is directly connected to the saw blade 204 so as to facilitate the movement of the saw blade.

The motor 246 is illustrated as located within the interior of the body. Motor 246 has shaft 248 extending therefrom. Shaft 248 has a spline gear at an end thereof opposite the motor 246. The spline gear engages with a gear 270 that is connected by a shaft to the sprocket associated with the chain 206. As such, the present invention is able to achieve a proper movement of the chain 206 in the configuration in which the saw blade 204 extends in its position aligned with the longitudinal axis of the body 202.

Figure 14:
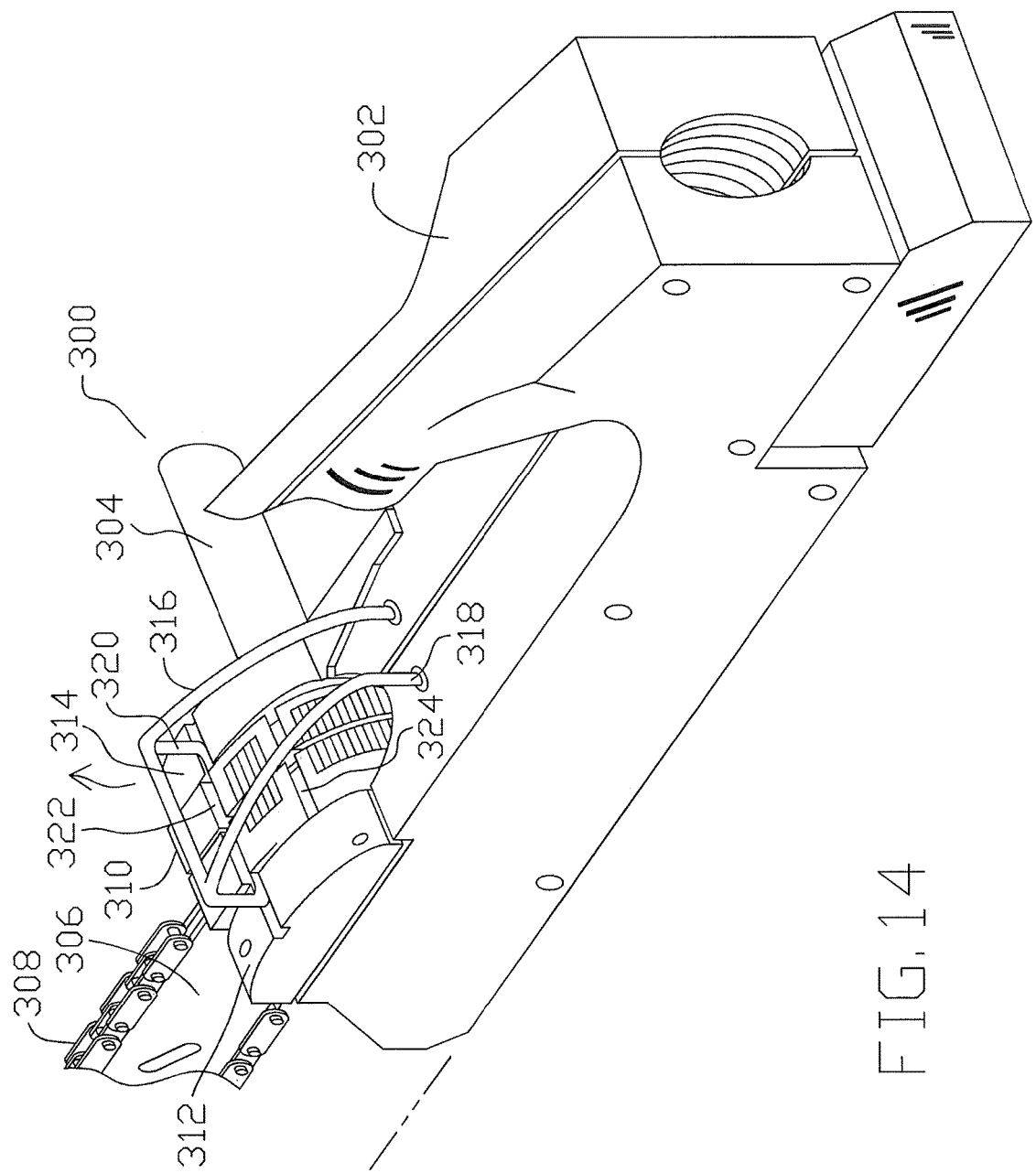
FIG. 14 is a perspective view of a fourth embodiment of the chainsaw apparatus of the present invention.

FIG. 14 shows a fourth alternative embodiment of the chainsaw apparatus 300 of the present invention. Chainsaw apparatus 300 includes a body 302 having a handle 304 extending outwardly from one side thereof. A saw blade 306 supports a chain 308 thereon.

Importantly, in FIG. 14, it can be seen that there is a plate 310 that is received between sides 312 and 314 of the body 302. Plate 310 will be rotatably mounted between the sides 312 and 314 so as to allow for the angular adjustment of the saw blade 306. There is a spring lock 316 that is affixed at one end 318 to the body 302. Spring lock 316 includes a portion 320 that can be received within a slot 322 formed on the periphery of the plate 310 and slots formed at the top of sides 312 and 314. Plate 310 also includes an additional slot 324, as illustrated in FIG. 14. As such, when it is desired to change the position of the blade 306, the spring lock 316 can be lifted upwardly such that the portion 320 frees the plate 310. The plate 310 can then be rotated by the handle 304 to the position such that the portion 320 can engage with the slot 324. The manually-operated thumb or fingertip grippage grooves allow the user to easily grasp or grip and, thus, rotationally turn the plate 310 in either the forward direction of travel or the reverse direction of travel from the frontal vertical end in order to move the saw blade into any incremental position of use. This "frontal/near central" rotation is made possible by the simple near-central position of the plate 310 located centrally between the sides 312 and 314. The spring lock 316 is specifically designed to have two spring-assisted/leverage-generating rod arms which extend from an originating base toward a front of the device in order to allow the user to gain and easily access the centrally-located plate 310 with a single thumb or forefinger in order to carry out the rotation. The central gap in the spring lock allows the user to easily gain access to the plate 310 for ease of rotation and for service access.

With respect to FIG. 14, when the lower frontal crossbar section identified as portion 320 of the spring lock 316 is manually disengaged from a pre-set locking action by the user, the user can again rotate the plate 310 in either the forward direction of rotation or the reverse direction of rotation. The spring lock 316 is specifically configured to automatically engage, interface, and thus lock in place. This occurs only when there exists a receptive engagement with a newly-aligned slot 322 (as shown in FIG. 14) or with the slot 324 when the plate 310 is rotated downwardly.

Figure 15:
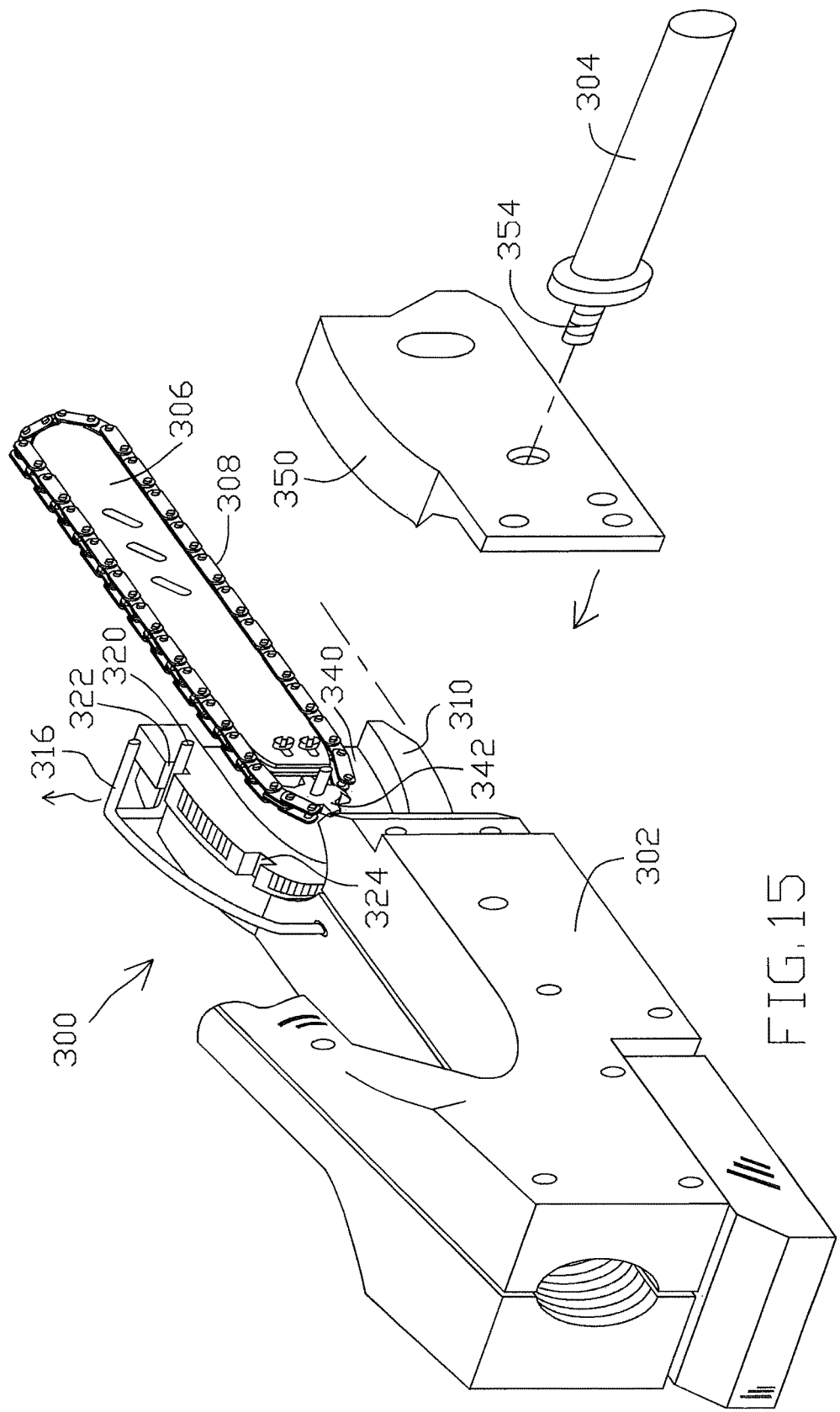
FIG. 15 is a partially exploded view of the chainsaw apparatus of the fourth embodiment of the chainsaw apparatus of the present invention.

FIG. 15 shows the interior configuration of the chainsaw apparatus 300 of this fourth embodiment. In particular, FIG. 15 shows that the plate 310 has a generally horseshoe-shaped or U-shaped configuration. The plate 310 includes a cut-out area 340 on an interior thereof. Slots 322 and 324 are illustrated as formed into the periphery of the plate 310. The spring lock 316 has portion 320 received within the slot 322. As such, the spring lock 316 serves to fix the position of the blade 306 in its position aligned with the longitudinal axis of the body 302.

In FIG. 15, it can be seen that the chain 308 is driven in a manner similar to that of the previous embodiments of the present invention. In particular, sprocket 342 engages with the chain 308 so as to instill the movement of the chain 308 around the saw blade 306. A panel 350 is positioned over the plate 310 and over a portion of the saw blade 306 and chain 308. Plate 350 can be secured to the body 302 in a conventional way, such as by screws or bolts.

Figure 16:
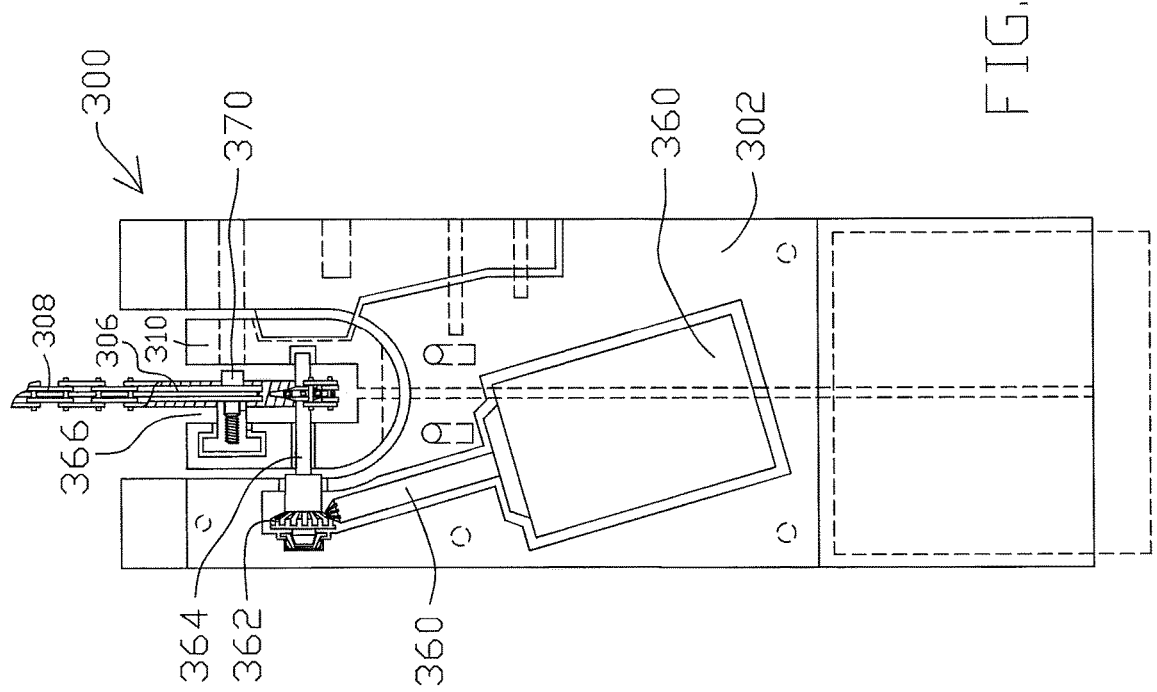
FIG. 16 is a cross-sectional top view of the fourth embodiment of the chainsaw apparatus of the present invention.

FIG. 16 shows the internal configuration and operation of the chainsaw apparatus 300 in accordance with this fourth alternative embodiment. In particular, a motor 360 is positioned on the interior of the body 302. Motor 360 includes a shaft 362 that extends so as to have a splined end engaged with a gear 362. Gear 362 is connected by a shaft 364 to a sprocket engaged with the chain 308. As such, the chain 308 will properly move in a manner similar to that described hereinbefore.

The plate 310 is illustrated as having a generally horseshoe-shaped cross-section. This horseshoe-shaped cross-section will define an interior 366 through which the saw blade 306 and the chain 308 extend. As such, the rotation of the plate 310 between the various positions will cause the blade 306 to move to different orientations. Fastener 370 serves to affix the saw blade 306 toward the steel base plate with allen head-type bolts.

Figure 17:
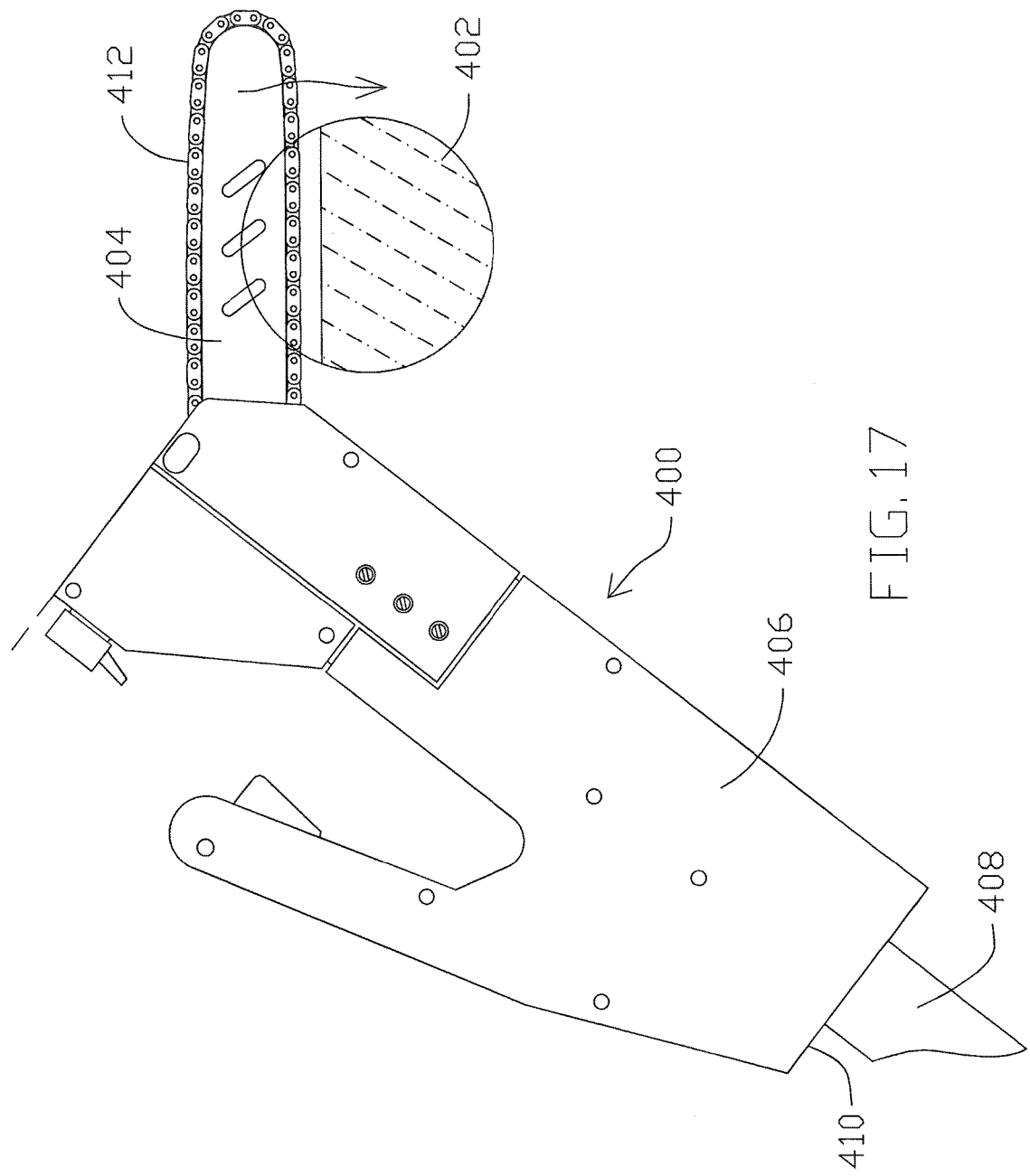
FIG. 17 is an illustration showing the use of the chainsaw apparatus of the present invention at an elevated position suitable for cutting trees or limbs.

FIG. 17 illustrates the use of the chainsaw apparatus 400 in an elevated position so as to cut a limb 402. It can be seen that the saw blade 404 has been moved to an intermediate position between the position extending transverse to the longitudinal axis of the body 406 and a position aligned with the longitudinal axis of the body 406. A pole 408 is affixed within the threaded receptacle at the back face 410 of the body 406 of the chain saw apparatus 400. In this orientation, the chainsaw apparatus 400 can be lifted to an elevated position so that the chain 412 can move around the saw blade 404 so as to cut the limb 402. This arrangement effectively eliminates the binding of the saw blade 404 and the chain 412 between the two partially cut halves of the limb 402 by allowing the user to have a near-horizontal level cut path. The rotation of the chain actually pulls the body 406 toward the limb 402 and helps to hold it tightly against the chainsaw in order to lessen the user's efforts and strain when holding the chainsaw at an elevated height.

Figure 18:
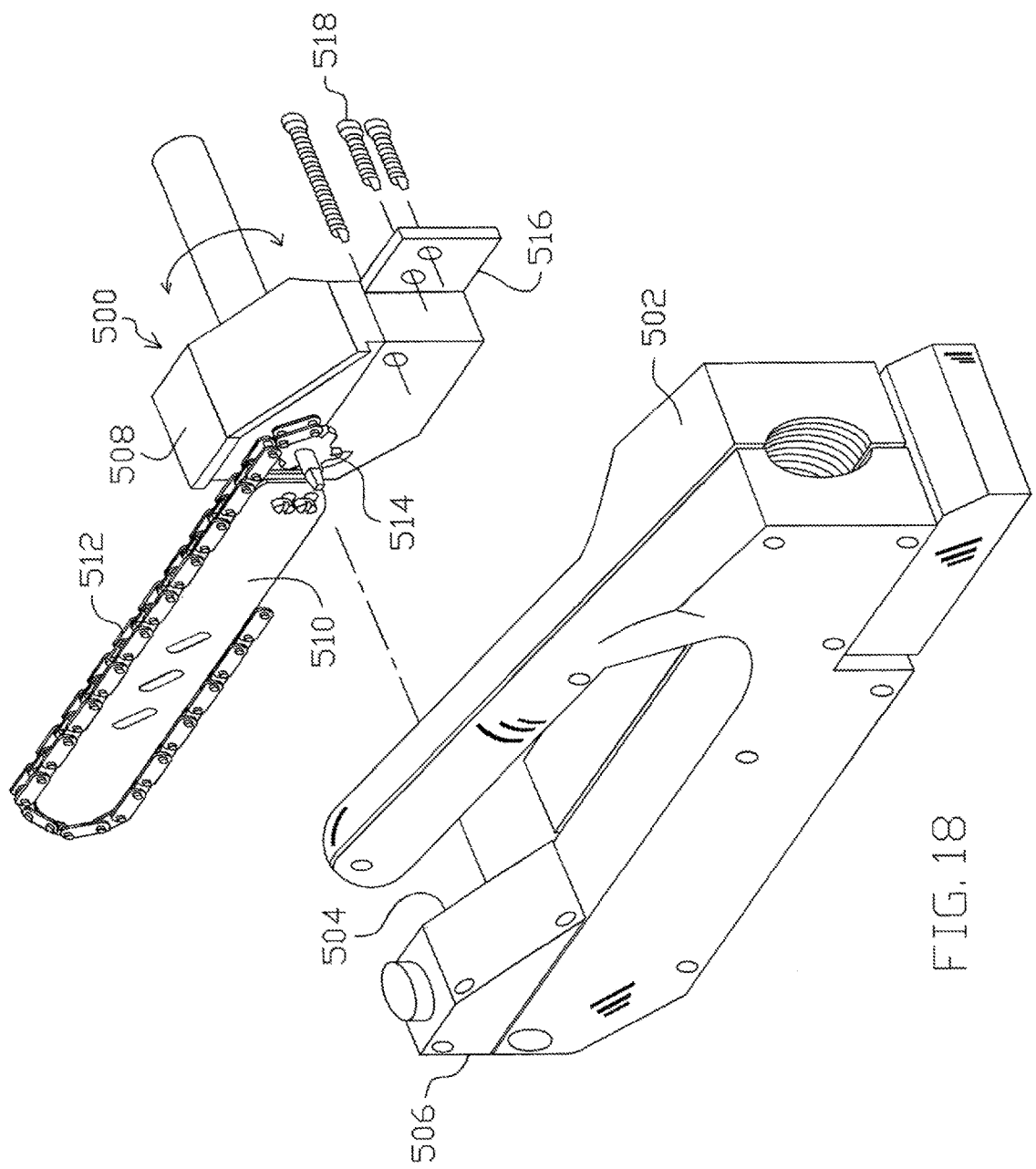
FIG. 18 is an exploded perspective view showing the chainsaw apparatus of the present invention as having a keyed configuration between the saw blade and the body.

FIG. 18 illustrates an exploded view showing the chainsaw apparatus 500 of the present invention. The chainsaw apparatus 500 has a body 502 having an internal cavity 504 adjacent an end 506 thereof. A male insert member 508 is particularly configured as a key for fitting within the cavity 504. The saw blade 510 extends outwardly of the male insert member 508. Chain 512 extends around the saw blade 510. The chain 512 is driven by a sprocket 514 that is mounted on the male insert member 508. A flange 516 extends outwardly of the male insert member 508. Fasteners 518 can be utilized so as to secure the flange 516 and the male insert member 508 to the body 502 and, in particular, within the cavity 504.

The embodiment shown in FIG. 18 allows for the easy disassembly and reassembly of the entire saw blade operational portion. As such, the saw blade 510 and the chain 512, along with other components, can be easily removed, cleaned and serviced.

Figure 19:
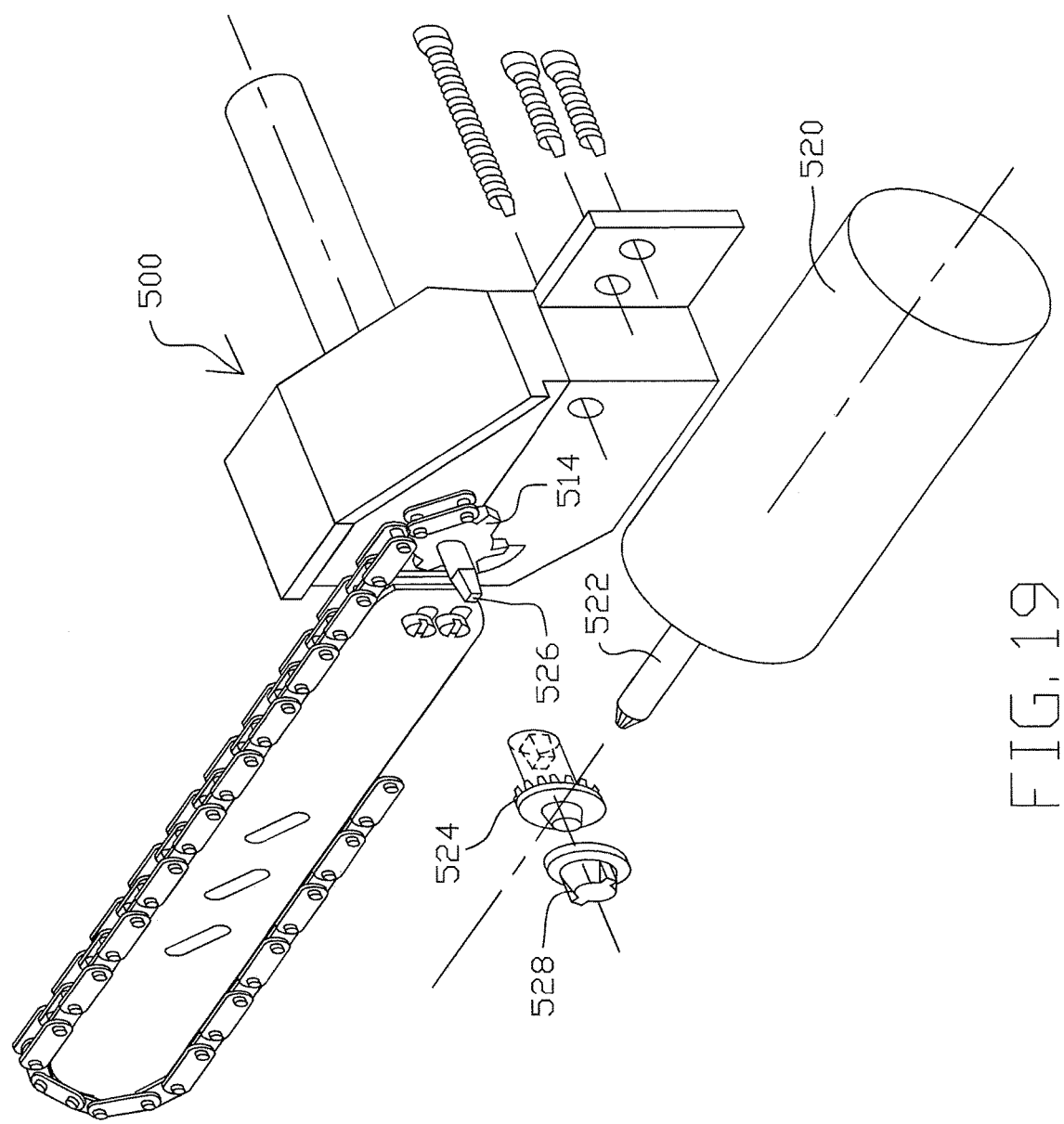
FIG. 19 is an exploded perspective view of the chainsaw apparatus of FIG. 18 showing, specifically, the arrangement of the motor in conjunction with the driving sprocket associated with the chain on the insert member.

FIG. 19 further illustrates the operational components associated with the embodiment 500. In particular, a motor 520 can be mounted within the interior of the body 502. The motor 520 has a shaft 522 extending therefrom. A spline gear 524 can be fitted upon a shaft 526 extending from the sprocket 514. A cap 528 will overlie the spline gear 524.

The embodiment 500 as shown in FIG. 19 demonstrates the association of the gear toward the actual drive sprocket 514. This right-sided saw blade configuration serves to house all of the "removable" shroud cover assembly in a single easy-to-remove piece. The male/female keyway interface (as shown in FIG. 19) makes this possible. Otherwise, it would not be possible to design this type of assembly. The user would not be able to freely access the entire drive sprocket in the openly exposed cavity region in order to regularly clean and service the internals therein without this "breakaway" male/female keyway interface. As such, the present invention provides an easy slip-type dismantling configuration. The embodiment 500 provides durable firm rotary stability toward the sprocket. The saw blade and the chain in both a left side mounting and a right side mounting smoothly stabilize the entire high-speed rotary drive aspect of the present invention. The drive sprocket is mountably supported from both sides in this configuration.

Figure 20:
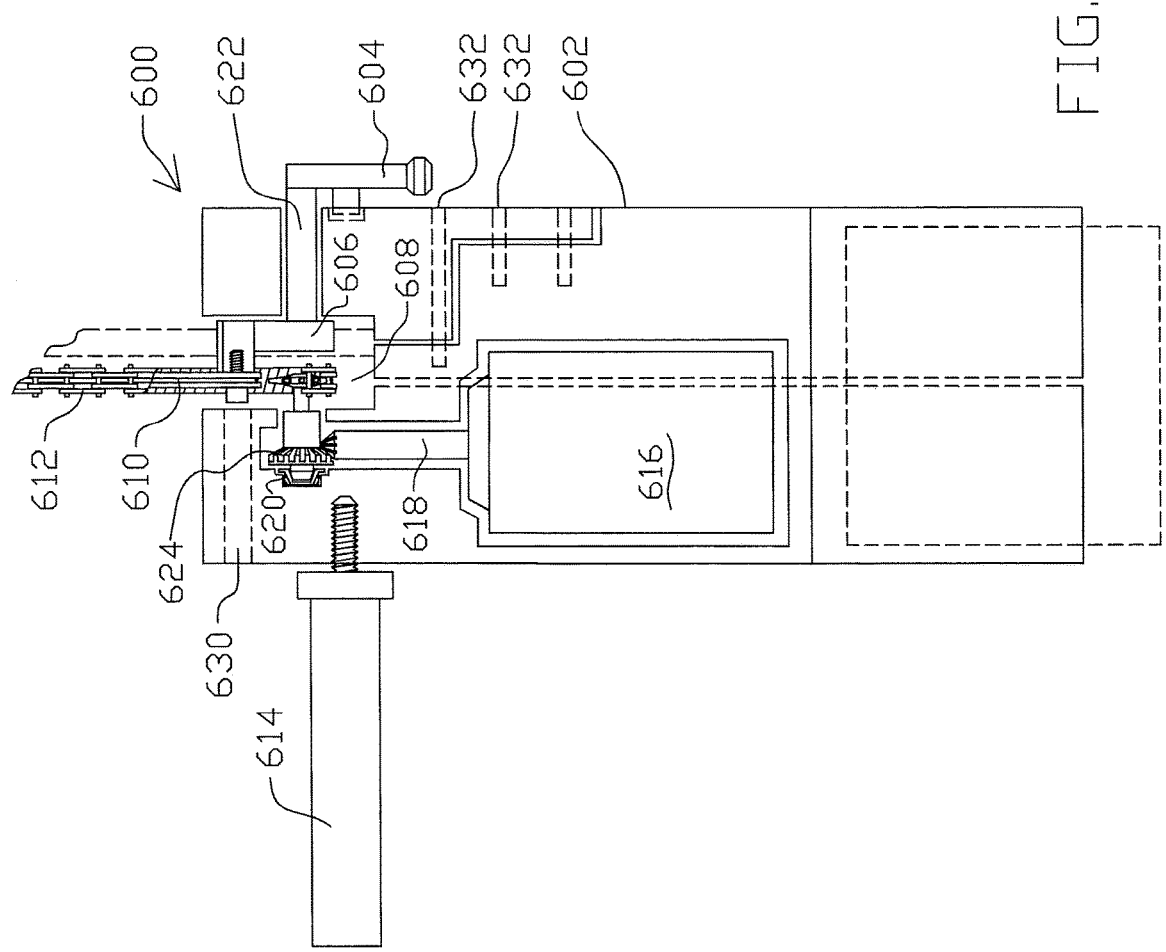
FIG. 20 is a plan view, in partial section showing the left-handled configuration of the embodiment of the present invention shown in FIGS. 18 and 19.

FIG. 20 shows a view of another embodiment of the present invention. In FIG. 20, the chainsaw apparatus 600 is illustrated as having body 602, arm 604 and a shifting member 606 maintained within a cavity 608 located in the body 602. The saw blade 610 extends outwardly of the cavity 608 and supports a chain 612 thereon. A handle 614 is threadedly secured on the left side by simple threading. The motor 616 includes a shaft 618 that causes the engagement with a spline gear 624 for the driving of a sprocket associated with the chain 612. A cap 620 is positioned over spline gear 624.

It can be seen that the rod 622 is sealed tight and shielded from cutting and shaving debris. The rod 622 is the only internally sealed component. As such, there is no possibility that the cutting debris can get jammed into any of the cavities of the shifting member 606 or behind it. As such, the shifting member 606 remains clean while the chainsaw is discharging fine cuttings and oil within the internal drive cavity section. The saw blade adjustment access port 630 is on the left side of the body 602. As such, saw blade adjustment can be achieved by access through the saw blade adjustment access port 630 through the use of an allen-type wrench. The arm 604 is on the right side of the body 602. As in the disclosure shown in FIGS. 18 and 19, the entire right side can come off as a single piece by first removing the saw blade mounting screws and then removing the assembly screws 632. As such, once again, the present invention facilitates the easy assembly of the chainsaw apparatus of the present invention.

Figure 21:
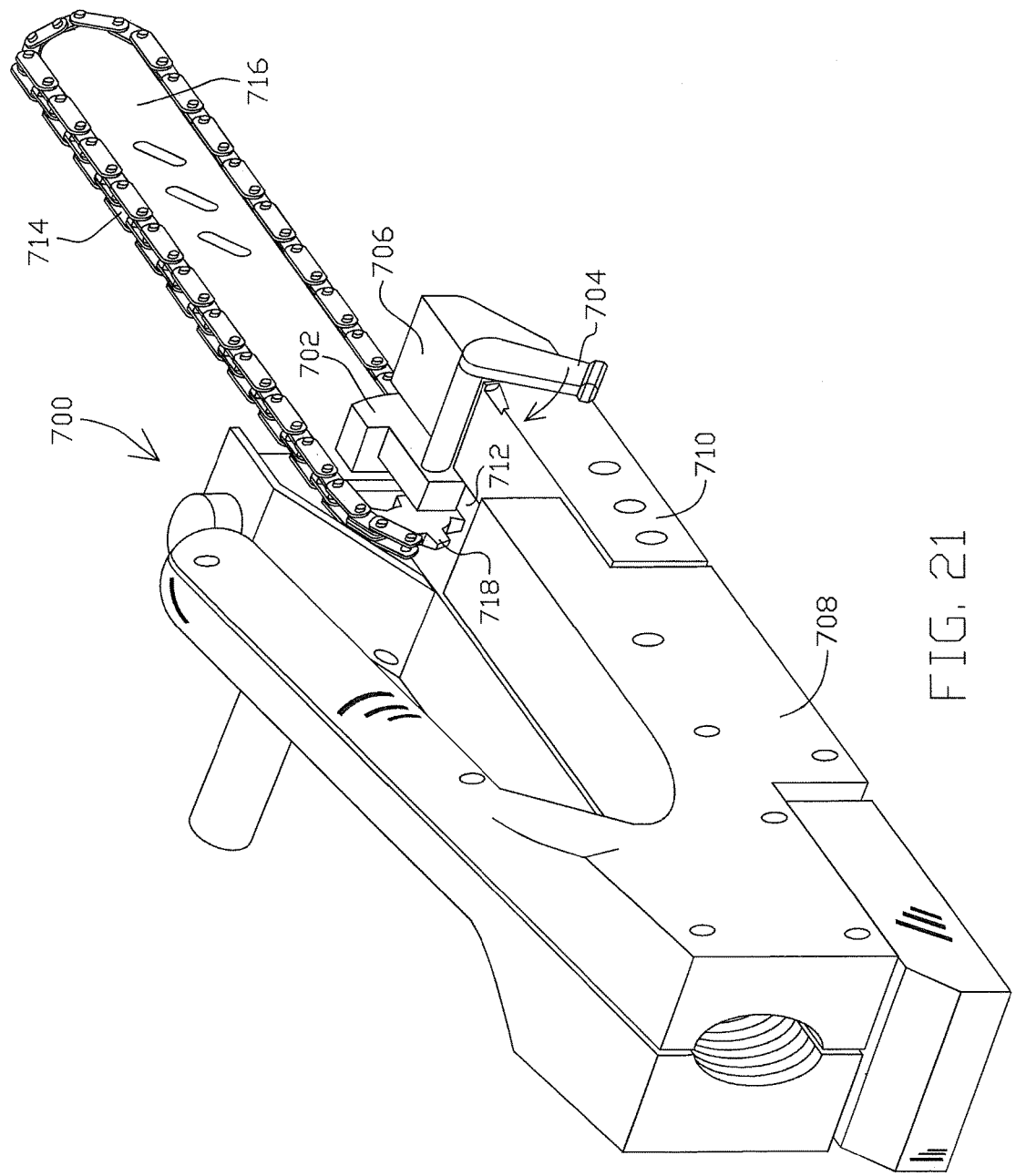
FIG. 21 is a perspective view of the third embodiment of the present invention showing, in particular, how the shifting member is located within the internal drive cavity.

FIG. 21 is a perspective view showing a detail of another embodiment of the present invention. In particular, the chainsaw apparatus 700, as shown in FIG. 21, has a different configuration of the shifting member 702. In particular, the arm 704 is supported within the male insert member 706 that is received within the cavity of the body 708. Flange 710 is secured by threaded members extending into the openings formed on the flange 710. The shifting member 702 is received within cavity 712 so as to allow for the free rotation of the shifting member 702. The chain 714 is supported on the saw blade 716 and is driven by the cooperation of the motor and the sprocket 718 (as described herein previously). The shifting member 702 is directly affixed to a surface of the saw blade 716 such that a movement of the arm 704 will cause a corresponding shifting movement of the shifting member 702 and the attached saw blade 716.

Figure 22:
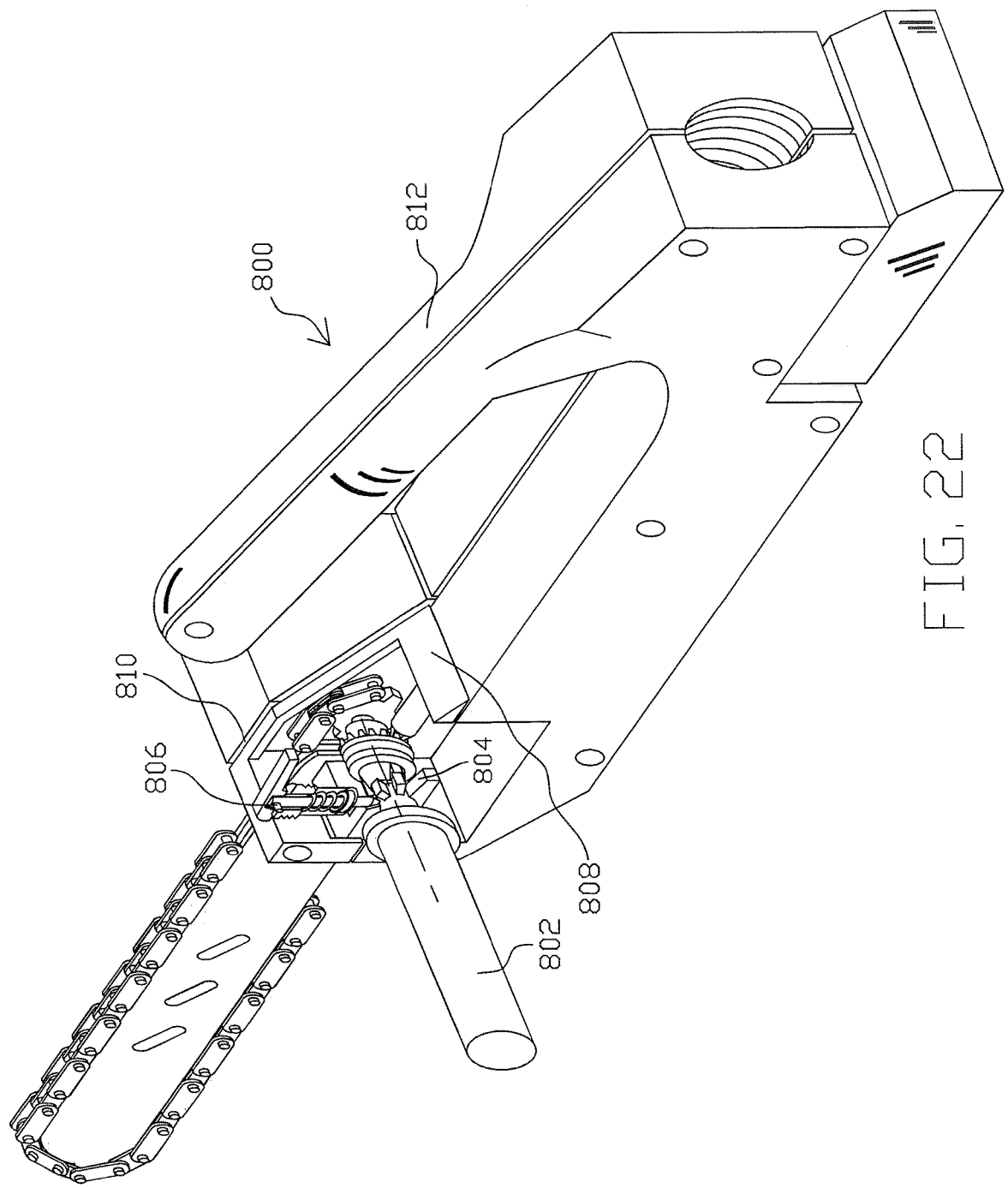
FIG. 22 is a perspective view showing a modification of the design of the second embodiment of the present invention.

FIG. 22 is a modification of the chainsaw apparatus 800 of the present invention. In particular, the handle 802 is connected to the toothed member 804 so as to allow for the rotational movement of the toothed member 804. A locking mechanism 806 is cooperative with the toothed member 804 (in the manner described herein previously). In FIG. 22, the male insert member 808 is illustrated as received within a cavity 810 formed on the body 812. As such, as in the previous embodiments, the cavity 810 can receive the male insert member 808. The chain saw 800 has the handle 802 extending outwardly for left-handed usage.

Figure 23:
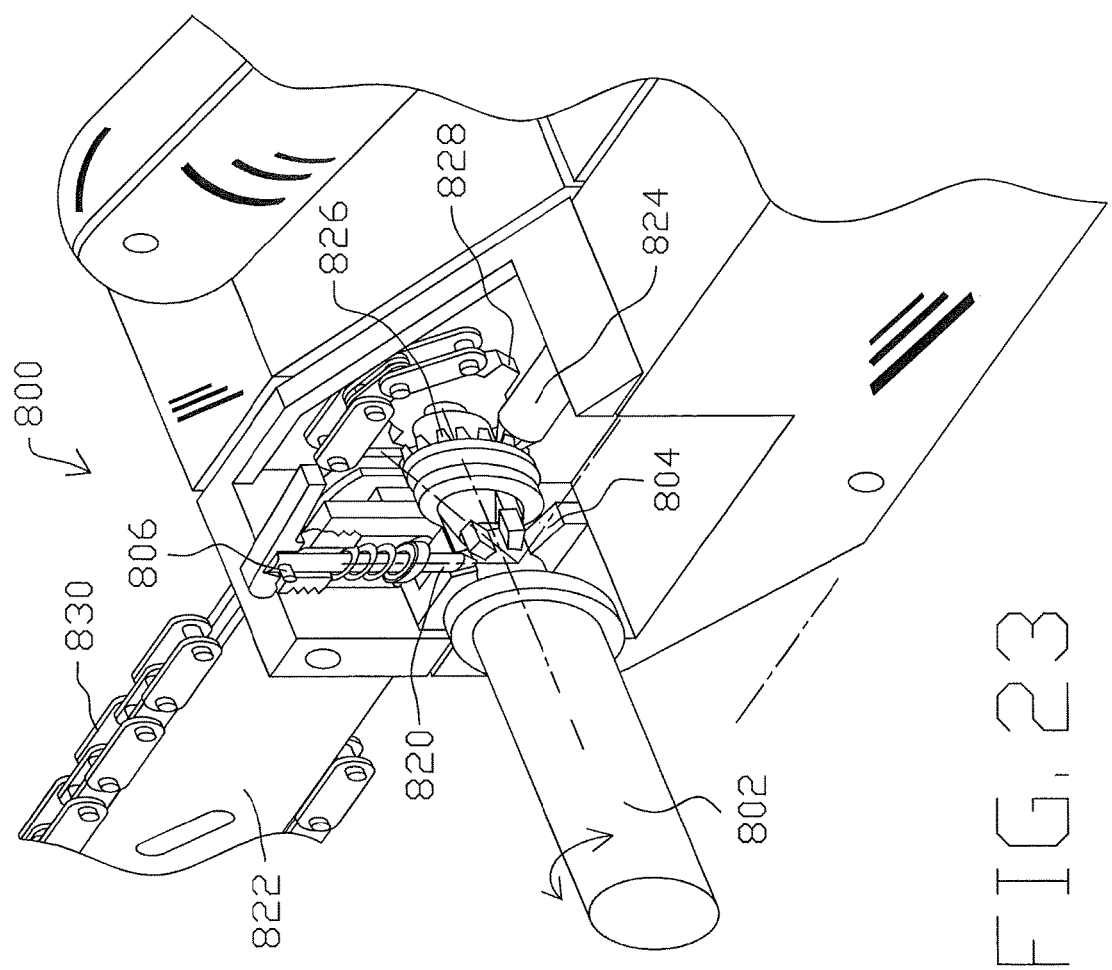
FIG. 23 is a detailed view showing the relationship between the locking mechanism in the shifting member of the present invention.

FIG. 23 specifically shows the configuration of the embodiment 800. As can be seen in FIG. 23, the handle 802 (or shifting member) is connected to the toothed member 804. The locking mechanism 806 operates so as to cause the locking pin 820 to enter a space between the teeth of the toothed member 804. As such, the position of the saw blade 822 can be modified, as desired. The shaft 824 of the motor is cooperative with the spline gear 826 so as to drive the sprocket 828 for the movement of the chain 830 around the saw blade 822.

Figure 24:
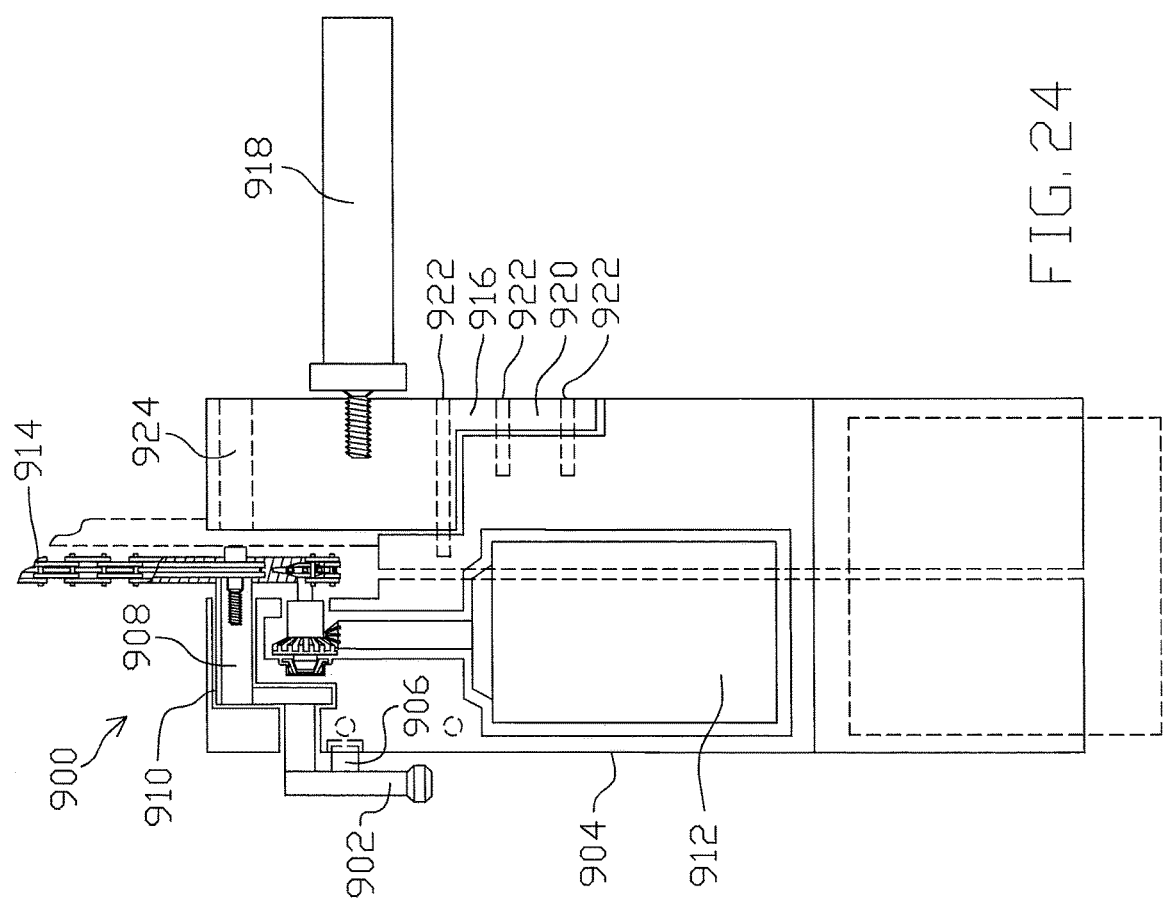
FIG. 24 is a top view showing an alternative arrangement of the second embodiment of the present invention.

FIG. 24 shows another alternative arrangement of the present invention. In particular, chainsaw 900 is configured such that the arm 902 is arranged on the left side of the body 904. The arm 902 includes a locking pin 906 that serves to fix the position of the arm 902. The arm 902 is connected to the shifting member 908 located within a cavity 910 of the body 904. The motor 912 is drivingly connected to the chain 914 in the manner described herein previously. In FIG. 24, it can be seen that there is a male insert member 916 that is received within the body 904. Male insert member 916 has handle 918 extending therefrom. Handle 918 is threadedly secured within the male insert member 916. The male insert member 916 includes a flange 920 that is secured to the body 904 through the use of fasteners 922. A saw blade screw access port 924 extends through the male insert member 916 so as to allow for the proper adjustment of the chain 914. FIG. 24 shows that when the male insert member 916 is removed, access to the saw blade and the chain 914 can be achieved. FIG. 24 shows the entire rotary components are positioned on the left side so that the chainsaw has a single, easy-to-remove right side cover plate with a simple grip handle mounted thereon.

The present invention can be used in a variety of configurations. In particular, the present invention can be used as a vortex saw, a pole saw, a reciprocating saw, a jigsaw, a chainsaw, a bandsaw, a hack saw (equipped with a metal cutting blade), a circular saw, a radial saw and a chop saw. The present invention is useful for the cutting and sawing of work material such as wood, plastic, steel, carbon fiber, insulation and material sheets. The present invention provides a continuous rotary action in which the saw chain is loosely interfaced with an incremental angle-adjustable saw blade mechanism such that the cutter teeth are driven at a high rate of speed so as to produce a near continuous cutting action toward the work materials. The chainsaw apparatus of the present invention can be employed in a near horizontal chain cutting pattern as well as performing a secondary function similar to service applications where a typical jigsaw would be employed. The present invention will cut work materials in the near right angle vertical position. The present invention also is able to perform a complete complex degree of cut paths in which user-defined touchless saw blade adjustment features of the shift handle mechanism of the switch arm mechanism facilitate the creation of such complex cut paths. The present invention allows the user to cut or saw from a variety of different angles. As such, this effectively transforms the chainsaw apparatus into an advanced rotary action chainsaw capable of cutting custom curvatures and sawing cut line arcs outside of traditional straight linear cutting techniques of non-adjustable chainsaws and circular-type saws. The present invention is a single, easy-to-use compact tool with a variety of general cutting and sawing applications for anyone, including at-home DIY handymen to heavy industrial and commercial use, demolition or remodeling projects. The present invention eliminates the need for expensive quick release and attachment accessory tools, external attachments or time-consuming user modifications with secondary service modification tools. The present invention is able to quickly switch from one cutting task to another.

The present invention performs in a similar fashion and as a near-perpendicular jigsaw cut path relative to the jigsaw's drive surface. The present invention allows the user to perform near-perpendicular cutting and sawing practices similar to the jigsaw's drive surface angle. The continuous rotary chainsaw of the present invention generates a greatly improved method of sawing or cutting of work materials in that it eliminates any negative cutting or sawing effects associated with a traditional use of a reciprocating saw blade jigsaw. The present invention provides a highly increased rate of cutting or sawing relative to the conventional jigsaw-type tool. Any single direction saw cut configuration of a jigsaw blade is inherently designed to provide a cutting action in the downward direction of travel of the saw blade. This develops an immediate negative dulling action on the subsequent return travel stroke of the jigsaw blade. General dulling and premature sawtooth wear failure is developed by the normal use of such a reciprocating saw blade. In contrast, the advanced continuous rotary driven action of the chainsaw of the present invention eliminates all negative reversing effects relative to the intended travel cut path. As such, the dulling effect is effectively eliminated.

The chainsaw cutting and sawing is only limited by the incremental distance of each individual cutter tooth from one another around the outer circumference of the chain of the chainsaw assembly. The ability of a chainsaw to perform a continuous cutting action is only restricted by the overall incremental distance between the cutter teeth component when in a continuous high-speed rotary motion.

Modern jigsaw reciprocating-type saw blades are specifically configured to perform cutting or sawing in both the perpendicular upward direction of the jigsaw drive surface and the generally perpendicular downward direction of the reciprocating motion from the drive surface of the jigsaw by being equipped with dual directional configurations of saw teeth on the blade. This can generate an inconsistent cutting stroke because they are required to generate a slight pause at the point of reversible retraction of the saw blade at the endpoint of the upward or downward stroke of reciprocation. As such, these jigsaws cannot achieve the advantages of the present invention.

Traditional chainsaws can be very difficult for the user to hold and grasp in a safe and effective manner. This is because of the various degrees of angles that the user must hold and maintain in order to perform the proper saw cuts. Usually, traditional chainsaws must be manipulated in odd or uncomfortable angular positions in order to create a proper saw cut. Traditional chainsaws are generally grasped and held by the user by an upper crossbar grip handle. This is generally located perpendicular to the linear plane of the saw blade and the cut line path. This tends to block the user's field of view of the intended cut line path and the surrounding work area and material surfaces. This could result in an unsafe usage environment and could result in damage to the chainsaw. Injuries to the user could also result.

In contrast, the present invention is equipped with a shift handle that allows the user to easily and quickly selectively switch and shift the saw blade to a select desired angle of use. There is no need for secondary hand or power tools in order to perform this shifting action. This shift-on-the-go feature now offers the user a touchless, hands-free capability in which to quickly select and switch the position of the saw blade regardless of whether the blade is in a power-on position or in a power-off position or resting at idle.

The rugged interlocking lock pin assembly of the lock mechanism of the present invention provides for a fail-safe locking position such that the saw blade is firmly locked in place when in use and cannot be accidentally disengaged from the locked-in-place position without the place setting. It is necessary for the user to take actual and positive steps to unlock the saw blade from its desired position.

The specific design of the handle of the present invention allows the user a greater level of clear visibility ability toward all frontal areas of the device. This includes a critical viewpoint of the frontal vertical base section of the device as well as a clear view of the work material surfaces during the sawing and cutting. This allows the user enough area to maintain a safe grip and to grasp the handle in a safe and effective manner. The handle configuration also facilitates the ability to easily carry and transport the chainsaw apparatus.

The majority of all excessive work material cuttings and shavings are effectively discharged in a generally downward angle from the point of contact with the cutter teeth and the cut line of the work material when the saw blade is positioned in the vertical position. As such, the bulk of the excessive cuttings and shavings will not hinder the user from being able to effectively view the work material and the work surface for safe operation of the device. The downward ejection of such shavings greatly improves the overall speed of use because of the ability to view the work surfaces. The present invention provides the user with the ability to clearly view the actual cut line and intended cut line by means of the application of a laser pointer. The laser pointer is assembled within the main body of the device. This provides the user with a generally forwardly projecting illuminated laser light source in order to develop a guidance pathway and a clear verifiable point of reference for any cut line or intended cut line paths.

Importantly, the present invention allows the user to cut or saw any work material at a near perpendicular corner joint right angle confluence of two or more pieces of work material. For example, this can be a common near horizontal floorboard and its companion near vertical wallboard. This is commonly known as a concavity region. The saw blade is configured in a manner in which the chain, when mounted in the near vertical position, is configured with the saw blade positioned and exposed slightly in front and extensively positioned outwardly from the base point of the frontal vertical base, along with being in near parallel alignment with the linear alignment of the near vertical base in order to project the saw blade and the chain further in front of the device. As such, the front forwardmost component of the device is located slightly in front of the blade and the chain when the blade and chain extend transverse to the body. As such, the present invention can cut and saw up to the intersecting right angle joint corner. As such, it is able to completely cut through a near horizontal floorboard which intersects a near perpendicular confluence with a near vertical wallboard. This is a significant improvement in that previous cutting devices will not perform a full corner end joint board near perpendicular type cut. As such, until the present invention, it was not possible to perform any degree of true corner point cutting practice. The traditional jigsaw blade is configured further back from a frontally mounted position and is generally recessed back into the body housing section so as to limit the ability of the jigsaw to perform any sort of full corner point junction cuts or sawing.

Traditional jigsaws are generally limited in their overall effective use in projects that require some degree of custom cutting and project specific modifications. These can be intricate demolition jobs and artistic remodeling of custom construction projects. The adjustable positioning of the saw blade of the chainsaw of the present invention can be achieved without any need for special modification tools or external modifications of the device. This also eliminates the need for a large bulky carrying and storage case since there are no extra attachment components that are included with the device. The reduction in both the size and requirements of the case in the simple one-piece design of the present invention provides for significant reduction in the final product cost. The present invention can be made of a generally lightweight material and be developed for quick, fast-paced user-defined transformations relative to the job requirements.

When a user must begin an initial cutting or sawing operation, the present invention utilizes a spring-assisted guide plate assembly in order to provide a stable surface. The guide plate can fully automatically retract inwardly toward a stop when it is pressed against a work surface. This generates a smooth and flush near-vertical plane at the front section of the chainsaw apparatus so that the device can be pressed in a generally forward direction by the user. This facilitates the ability of the present invention to reach into very difficult corners or areas that would not be accessible by traditional jigsaws and reciprocating blade-type saws.

The use of the extension pole with the present invention is achieved through the threaded connection of the extension pole at the back of the body of the chainsaw apparatus. This eliminates the need for the user to dangerously climb to elevated locations and avoids the need for the user to utilize ladders or other platforms in order to perform effective sawing and cutting at the elevated heights.

The foregoing disclosure and description of the invention is illustrative and explanatory thereof. Various changes in the details of the illustrated construction can be made within the scope of the present claims without departing from the true spirit of the invention. The present invention should only be limited by the following claims and their legal equivalents.

I claim:

1. A chainsaw apparatus comprising:
   a body having a handle formed thereon or attached thereto, said body having a longitudinal axis;
   a motor;
   a saw blade coupled to said body, said saw blade extendable in transverse relationship to said longitudinal axis of said body, and said saw blade being adjustably coupled to said body so as to be movable between the position transverse to the longitudinal axis of said body to a position aligned with said longitudinal axis of said body;
   a chain movably positioned on said saw blade, said motor being drivingly connected to said chain so as to cause said chain to move around said saw blade; and
   an angle adjustment mechanism connected to said saw blade and to said body, said angle adjustment mechanism adapted to fix an angular position of said saw blade relative to said body;
   wherein said angle adjustment mechanism comprises a plate pivotally received by said body, said plate being affixed to an end of said saw blade, said saw blade and said chain extending outwardly of said plate;
   wherein said plate has a plurality of slots formed in spaced relation to each other at a periphery of said plate; and
   wherein said angle adjustment mechanism further comprises a spring lock connected to said body and has a surface receivable in at least one of said plurality of slots so as to fix an angular orientation of said saw blade relative to said body.

2. The chainsaw apparatus of claim 1, said body having a surface thereon that extends in spaced parallel relation with said saw blade.

3. The chainsaw apparatus of claim 1, said body having a surface thereon that is in parallel relationship to a longitudinal axis of said saw blade when said saw blade is in the position aligned with said longitudinal axis of said body.

4. The chainsaw apparatus of claim 1, said body having a forward surface, said chain having an outermost surface aligned in coplanar relationship with said forward surface of said body.

5. The chainsaw apparatus of claim 1, said body having a forward surface, said body having a guide plate positionable thereon or therein, said guide plate having a planar surface at an end thereof, said planar surface defining a guide plane in parallel planar relationship to a surface of said chain.

6. The chainsaw apparatus of claim 1, further comprising:
   a laser pointer mounted in said body, said laser pointer adapted to direct a laser beam in a direction corresponding to an orientation of said saw blade.

7. The chainsaw apparatus of claim 1, said motor being an electric motor, the chainsaw apparatus further comprising:
   a battery pack electrically connected to said electric motor.

8. The chainsaw apparatus of claim 1, said motor having a shaft extending outwardly therefrom, said chain having a sprocket rotatably mounted to said saw blade and engaged with said chain, said shaft having a spline gear at an end thereof, said spline gear engaged with a gear connected to said sprocket such that the rotation of said shaft causes a rotation of said sprocket and the movement of said chain.

9. The chainsaw apparatus of claim 1, said handle of said body extending upwardly at an acute angle with respect to an upper surface of said body, said handle having a power switch mounted thereon, said power switch being electrically connected to said motor.

* * * * *